United States Patent
Peng et al.

(10) Patent No.: US 12,301,381 B2
(45) Date of Patent: May 13, 2025

(54) DIAL-UP PACKET PROCESSING METHOD, NETWORK ELEMENT, SYSTEM, AND NETWORK DEVICE

(71) Applicant: HUAWEI TECHNOLOGIES CO., LTD., Shenzhen (CN)

(72) Inventors: Tao Peng, Nanjing (CN); Rongrong Hua, Nanjing (CN); Zhouyi Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 17/945,309

(22) Filed: Sep. 15, 2022

(65) Prior Publication Data

US 2023/0018346 A1    Jan. 19, 2023

Related U.S. Application Data

(63) Continuation of application No. PCT/CN2021/081104, filed on Mar. 16, 2021.

(30) Foreign Application Priority Data

Mar. 16, 2020 (CN) .......................... 202010183200.0

(51) Int. Cl.
*H04L 12/00* (2006.01)
*H04L 12/46* (2006.01)
*H04L 41/5019* (2022.01)

(52) U.S. Cl.
CPC ...... *H04L 12/4633* (2013.01); *H04L 41/5019* (2013.01)

(58) Field of Classification Search
None
See application file for complete search history.

(56) References Cited

U.S. PATENT DOCUMENTS 9,253,019 B1    2/2016 Romanov et al.
2009/0252133 A1   10/2009 Watanabe et al.
(Continued)

FOREIGN PATENT DOCUMENTS

CN    109428792 A    3/2019
CN    110166270 A    8/2019
(Continued)

OTHER PUBLICATIONS

Hu L Huang R Gu China Mobile Victor Lopez Telefonica Jun Song Michael Wang Huawei A:"Requirements for Control Plane and User Plane Separated BNG Protocol;draft-cuspdt-rtgwg-cusp-requirements-00.txt", XP015122526,Oct. 27, 2017,total 11 pages.

*Primary Examiner* — Abdelillah Elmejjarmi

(57) ABSTRACT

This application provides a dial-up packet processing method. The method is applied to a dial-up packet processing system. The system includes a controller, an access gateway, a forwarding plane network element, and a control plane network element that are connected to each other. The method includes: The control plane network element receives a dial-up packet from the access gateway, where the dial-up packet is a dial-up packet sent by user equipment to the access gateway; the control plane network element sends an authentication request to an external server, where the authentication request is generated by the control plane network element based on the dial-up packet; the control plane network element receives dial-up success information sent by the external server; and the control plane network element determines the forwarding plane network element based on the dial-up success information.

14 Claims, 10 Drawing Sheets

(56) References Cited

U.S. PATENT DOCUMENTS

| | | | | |
|---|---|---|---|---|
| 2013/0097674 A1* | 4/2013 | Jindal | ................ | H04W 12/068 |
| | | | | 709/227 |
| 2014/0092899 A1* | 4/2014 | Krishna | ................ | H04L 61/503 |
| | | | | 370/389 |
| 2016/0285736 A1 | 9/2016 | Gu | | |
| 2017/0366388 A1* | 12/2017 | Begeer | ................ | H04L 63/0892 |
| 2019/0052580 A1 | 2/2019 | Peng et al. | | |
| 2020/0163012 A1* | 5/2020 | Zhu | ....................... | H04W 12/06 |

FOREIGN PATENT DOCUMENTS

| | | |
|---|---|---|
| CN | 110650077 A | 1/2020 |
| CN | 106559451 B | 9/2020 |
| EP | 2713583 A1 | 4/2014 |
| EP | 3402305 A1 | 11/2018 |
| EP | 3493508 A1 | 6/2019 |
| JP | 2019520755 A | 7/2019 |
| WO | 2019042912 A1 | 3/2019 |

\* cited by examiner

DIAL-UP PACKET PROCESSING METHOD, NETWORK ELEMENT, SYSTEM, AND NETWORK DEVICE

CROSS-REFERENCE TO RELATED APPLICATIONS

This application is a continuation of International Application No. PCT/CN2021/081104, filed on Mar. 16, 2021, which claims priority to Chinese Patent Application No. 202010183200.0, filed on Mar. 16, 2020. The disclosures of the aforementioned applications are hereby incorporated by reference in their entireties.

TECHNICAL FIELD

This application relates to the communication field, and in particular, to a dial-up packet processing method, a network element, a system, and a network device.

BACKGROUND

With development of software-defined networking (SDN) and network functions virtualization (NFV) technologies, a metropolitan area network evolves from a conventional network-centric architecture to a data center-centric network architecture, and a conventional network element device gradually evolves toward decoupling of a forwarding plane and a control plane. A broadband network gateway (BNG) configured to perform operations such as user authentication, access control, and traffic scheduling also evolves toward decoupling of a forwarding plane and a control plane. After forwarding and control of the BNG are decoupled, the BNG can be converted into a control plane network element and a forwarding plane network element. One control plane network element can manage a plurality of forwarding plane network elements. Ideally, when the forwarding plane and the control plane are completely decoupled, the forwarding plane network element processes only a forwarding task of forwarding a user data packet, and the control plane network element processes remaining non-forwarding tasks, such as resource scheduling, user authentication, charging, and authorization. In this way, forwarding and control are completely decoupled. This greatly facilitates deployment and operations and maintenance of a carrier. In comparison with a single BNG, device utilization and reliability can be greatly improved.

However, in a current network, forwarding and control of a BNG are not completely decoupled, and a forwarding plane network element still needs to participate in dial-up packet processing in the current network. Consequently, work of the forwarding plane network element includes forwarding of a data packet sent by a user, and further includes identification, processing, and forwarding of a dial-up packet sent by the user. The forwarding plane network element is heavily loaded and has a high failure rate. In addition, incomplete decoupling of a forwarding plane and a control plane also affects network deployment and operations and maintenance processes of a carrier.

SUMMARY

This application provides a dial-up packet processing method, a network element, a system, and a network device, to resolve a problem of heavy load of a forwarding plane network element and incomplete decoupling of a forwarding plane and a control plane in a current dial-up packet processing process.

According to a first aspect, a dial-up packet processing method is provided. The method is applied to a dial-up packet processing system. The system includes a controller, an access gateway, a forwarding plane network element, and a control plane network element that are connected to each other. The control plane network element may be a virtual broadband network gateway-control plane network element (Virtual BNG-Control Plane) device or a virtual session control unit (vSCU) that is implemented based on a general-purpose physical server with reference to a network functions virtualization technology. The vBNG-CP device or the vSCU is a virtual network device. The virtual network device may be a virtual machine (VM) that can implement functions of the foregoing control plane network element. The virtual machine is deployed on a hardware device (for example, a physical server such as an X86 server). The virtual machine is a complete computer system, obtained through software simulation, that runs in a completely isolated environment and has a complete hardware system function. After reading this application, a person skilled in the art may virtualize, on a general-purpose physical server with reference to the virtualized network function (VNF) technology, one or more vBNG-CP devices or virtual session control units vSCUs having the foregoing function. Details are not described herein again. The method includes:

The control plane network element receives a dial-up packet from the access gateway, where the dial-up packet is a dial-up packet sent by user equipment to the access gateway.

The control plane network element sends an authentication request to an external server, where the authentication request is generated by the control plane network element based on the dial-up packet.

The control plane network element receives dial-up success information sent by the external server.

The control plane network element determines the forwarding plane network element based on the dial-up success information, so that the user equipment performs network communication through the forwarding plane network element.

In the foregoing method, after receiving the dial-up packet, the access gateway sends the dial-up packet to the control plane network element for processing. After interacting with the external server to obtain the dial-up success information, the control plane network element may determine the target forwarding plane network element based on SLA information in the dial-up success information, so that the user equipment performs network communication through the forwarding plane network element. The forwarding plane network element does not participate in an entire dial-up packet processing process, so that processing pressure of the forwarding plane network element can be reduced. The forwarding plane network element only needs to process forwarding of a data packet, and does not need to participate in processing of the dial-up packet. This implements decoupling of a forwarding plane and a control plane in real sense, and facilitates deployment and operations and maintenance of a carrier network.

In an embodiment, the dial-up packet includes an internet protocol IP address of the user equipment, and after that the control plane network element determines the forwarding plane network element based on the dial-up success information, the method further includes: The control plane network element sends information about the forwarding plane network element to the controller, so that the controller sends a tunnel establishment request to the access gateway, where the tunnel establishment request is generated by the controller based on the information about the forwarding plane network element, the tunnel establishment request is used to establish a first communication tunnel between the access gateway and the forwarding plane network element, and the first communication tunnel is in a correspondence with the IP address.

It may be understood that after determining the target forwarding plane network element corresponding to an SLA level of the user equipment, the control plane network element notifies the controller of interface information of the target forwarding plane network element, so that the controller can deliver the migration instruction to the access gateway, to establish the tunnel between the access gateway and the target forwarding plane network element. After the tunnel is established between the access gateway and the forwarding plane network element, when the user equipment sends a data packet to the access gateway again, the access gateway may directly send the data packet to the target forwarding plane network element through the communication tunnel, so that the user equipment can directly forward the data packet through the target forwarding plane network element that matches the SLA level of the user equipment. Therefore, packet forwarding efficiency is improved. In addition, after the communication tunnel is established, one user equipment can exclusively use one virtual local area network (Virtual Local Area Network, VLAN), so that user experience is improved.

In an embodiment, the information about the forwarding plane network element includes the interface information of the forwarding plane network element and interface information of the access gateway. Specifically, after the AGW receives the tunnel establishment request, the AGW may determine, based on the information that is about the forwarding plane network element and that is in the tunnel establishment request, the tunnel to the target forwarding plane network element, and map port information of the user equipment to the tunnel based on the port information that is of the user equipment and that is in the tunnel establishment request.

It should be noted that the information about the forwarding plane network element may include the interface information of the AGW and the interface information of the forwarding plane network element, and may further include the port information of the user equipment. For example, a format of the information about the forwarding plane network element may be as follows: AGW_ID/ANI_slot/ANI_subslot/ANI_port/VLAN_ID/QINQ_ID, NAS_UpIdentifier/NAS_slot/NAS_subslot/NAS_port: SVLAN. CVLAN. AGW_ID/ANI_slot/ANI_subslot/ANI_port/VLAN_ID/QINQ_ID is access information of the user equipment and ID information of the AGW, and NAS_UpIdentifier/NAS_slot/NAS_subslot/NAS_port: SVLAN. CVLAN indicates the interface information of the forwarding plane network element, where NAS_UpIdentifier indicates a name of the forwarding plane network element, which is followed by slot, subslot, port, and VLAN information of the forwarding plane network element.

In an embodiment, when the IP address has been in a correspondence with a second communication tunnel, after that the control plane network element determines the forwarding plane network element based on the dial-up success information, the method further includes: The control plane network element sends the information about the forwarding plane network element to the controller, so that the controller sends a tunnel switch request to the access gateway, where the tunnel switch request is generated by the controller based on the information about the forwarding plane network element, the tunnel switch request is used to switch a communication tunnel corresponding to the IP address from the second communication tunnel to the first communication tunnel, and the second communication tunnel is a communication tunnel between the access gateway and another forwarding plane network element.

It may be understood that, when the user equipment sends a dial-up packet for the first time, if the AGW sends the dial-up packet to the control plane network element, because the SLA level of the user equipment is low, the control plane network element determines to use a UP 1 to forward a data packet of the user equipment. Assuming that a user is not satisfied with a current network service, after the SLA level is changed to a high level, the user equipment sends the dial-up packet for the second time. After receiving the dial-up packet for the second time, the AGW also sends the packet to the control plane network element, the control plane network element determines to use a UP 2 to forward a data packet of the user equipment. The forwarding plane network element does not need to participate in the two dial-up packet processing processes, so that processing pressure of the forwarding plane network element is greatly reduced.

In an embodiment, the dial-up success information includes the service level agreement SLA information corresponding to the IP address, and that the control plane network element determines the forwarding plane network element based on the dial-up success information includes: The control plane network element determines the forwarding plane network element based on the SLA information.

It may be understood that a user having a high SLA level is a high-priority user, and a forwarding plane network element of a light-loaded and high-quality network may be bound to the user, to forward a data packet for the user. A user having a low SLA level is a low-priority user. A forwarding plane network element of a high-loaded and low-quality network may be bound to the user, to forward a packet for the user. Therefore, the forwarding plane network element determined based on the SLA information of the user is a forwarding plane network element that best satisfies a user requirement, and the port information of the user equipment is mapped to the tunnel between the AGW and the forwarding plane network element, so that each time the user equipment sends a data packet, the AGW may directly send, through the tunnel, the data packet of the user equipment to the forwarding plane network element corresponding to the SLA information of the user. Therefore, user experience is improved.

In an embodiment, after that the control plane network element receives dial-up success information sent by the external server, the method further includes: The control plane network element generates session information based on the dial-up success information, where the session information corresponds to the IP address; and the control plane network element sends the session information to the forwarding plane network element, so that the forwarding plane network element publishes routing information to the outside based on the session information, where a destination address of the routing information is the IP address.

It may be understood that the destination address of the routing information is the IP address corresponding to the user equipment, so that after again receiving a data packet sent by the user equipment, the target forwarding plane network element may determine a next-hop IP address of the data packet based on a destination IP address of the data packet and the routing information, to forward the data packet of the user equipment.

According to a second aspect, a dial-up packet processing method is provided. The method is applied to a dial-up packet processing system. The system includes a controller, an access gateway, a forwarding plane network element, and a control plane network element that are connected to each other. The method includes:

The access gateway receives a sent dial-up packet sent by user equipment, where the dial-up packet includes an internet protocol IP address of the user equipment.

The access gateway sends the dial-up packet to the control plane network element.

The access gateway receives a tunnel establishment request from the controller, where the tunnel establishment request is used to establish a communication tunnel between the access gateway and the forwarding plane network element.

The access gateway establishes a first communication tunnel to the forwarding plane network element based on the tunnel establishment request, where the first communication tunnel is in a correspondence with the IP address.

In the foregoing method, after receiving the dial-up packet, the access gateway sends the dial-up packet to the control plane network element for processing. After interacting with an external server to obtain dial-up success information, the control plane network element may determine the target forwarding plane network element based on SLA information in the dial-up success information, and notifies the controller of interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of a data packet, and does not need to participate in processing of the dial-up packet. This implements decoupling of a forwarding plane and a control plane in real sense, and facilitates deployment and operations and maintenance of a carrier network.

In an embodiment, the forwarding plane network element is determined by the control plane network element based on the dial-up success information returned by the external server, after the control plane network element generates an authentication request based on the dial-up packet and sends the authentication request to the external server; and the tunnel establishment request is generated by the controller based on information that is about the forwarding plane network element and that is sent by the control plane network element.

In an embodiment, the dial-up success information includes the service level agreement SLA information corresponding to the IP address, and the forwarding plane network element is determined based on the SLA information in the dial-up success information returned by the external server, after the control plane network element generates the authentication request based on the dial-up packet and sends the authentication request to the external server.

It may be understood that a user having a high SLA level is a high-priority user, and a forwarding plane network element of a light-loaded and high-quality network may be bound to the user, to forward a data packet for the user. A user having a low SLA level is a low-priority user. A forwarding plane network element of a high-loaded and low-quality network may be bound to the user, to forward a packet for the user. Therefore, the forwarding plane network element determined based on the SLA information of the user is a forwarding plane network element that best satisfies a user requirement, and port information of the user equipment is mapped to the tunnel between the AGW and the forwarding plane network element, so that each time the user equipment sends a data packet, the AGW may directly send, through the tunnel, the data packet of the user equipment to the forwarding plane network element corresponding to the SLA information of the user. Therefore, user experience is improved.

In an embodiment, the information about the forwarding plane network element includes the interface information of the forwarding plane network element and interface information of the access gateway. Specifically, after the AGW receives the tunnel establishment request, the AGW may determine, based on the information that is about the forwarding plane network element and that is in the tunnel establishment request, the tunnel to the target forwarding plane network element, and map the port information of the user equipment to the tunnel based on the port information that is of the user equipment and that is in the tunnel establishment request.

It should be noted that the information about the forwarding plane network element may include the interface information of the AGW and the interface information of the forwarding plane network element, and may further include the port information of the user equipment. For example, a format of the information about the forwarding plane network element may be as follows: AGW_ID/ANI_slot/ANI_subslot/ANI_port/VLAN_ID/QINQ_ID, NAS_UpIdentifier/NAS_slot/NAS_subslot/NAS_port: SVLAN. CVLAN. AGW_ID/ANI_slot/ANI_subslot/ANI_port/VLAN_ID/QINQ_ID is access information of the user equipment and ID information of the AGW, and NAS_UpIdentifier/NAS_slot/NAS_subslot/NAS_port: SVLAN. CVLAN indicates the interface information of the forwarding plane network element, where NAS_UpIdentifier indicates a name of the forwarding plane network element, which is followed by slot, subslot, port, and VLAN information of the forwarding plane network element.

In an embodiment, when the IP address has been in a correspondence with a second communication tunnel, the method further includes: The access gateway receives a tunnel switch request from the controller, where the tunnel switch request is generated by the controller based on the information about the forwarding plane network element; and the access gateway switches a communication tunnel corresponding to the IP address from the second communication tunnel to the first communication tunnel, where the second communication tunnel is a communication tunnel between the access gateway and another forwarding plane network element.

It may be understood that, when the user equipment sends a dial-up packet for the first time, if the AGW sends the dial-up packet to the control plane network element, because an SLA level of the user equipment is low, the control plane network element determines to use a UP 1 to forward a data packet of the user equipment. Assuming that a user is not satisfied with a current network service, after the SLA level is changed to a high level, the user equipment sends the dial-up packet for the second time. After receiving the dial-up packet for the second time, the AGW also sends the packet to the control plane network element, the control plane network element determines to use a UP 2 to forward a data packet of the user equipment. The forwarding plane network element does not need to participate in the two dial-up packet processing processes, so that processing pressure of the forwarding plane network element is greatly reduced.

In an embodiment, the method further includes: The access gateway receives the data packet, where a source IP address of the data packet is the IP address; the access gateway determines, based on the IP address, the first communication tunnel corresponding to the IP address; and the access gateway transmits the data packet to the forwarding plane network element through the first communication tunnel.

It may be understood that, after the tunnel is established between the access gateway and the forwarding plane network element, when the user equipment sends a data packet to the access gateway again, the access gateway may directly send the data packet to the target forwarding plane network element through the communication tunnel, so that the user equipment can directly forward the data packet through the target forwarding plane network element that matches the SLA level of the user equipment. Therefore, packet forwarding efficiency is improved.

According to a third aspect, a dial-up packet processing method is provided. The method is applied to a dial-up packet processing system. The system includes a controller, an access gateway, a forwarding plane network element, and a control plane network element that are connected to each other. The method includes:

A receiving unit is configured to receive information that is about the forwarding plane network element and that is sent by the control plane network element, where the information about the forwarding plane network element is determined by the control plane network element after the control plane network element receives a dial-up packet that is of user equipment and that is sent by the access gateway, and the dial-up packet includes an internet protocol IP address of the user equipment.

A generation unit is configured to generate a tunnel establishment request based on the information about the forwarding plane network element, where the tunnel establishment request is used to establish a communication tunnel between the access gateway and the forwarding plane network element.

A sending unit is configured to send the tunnel establishment request to the access gateway, so that the access gateway establishes a first communication tunnel to the forwarding plane network element based on the tunnel establishment request, where the first communication tunnel is in a correspondence with the IP address.

In the foregoing method, after receiving the dial-up packet, the access gateway sends the dial-up packet to the control plane network element for processing. After interacting with an external server to obtain dial-up success information, the control plane network element may determine the target forwarding plane network element based on SLA information in the dial-up success information, and notifies the controller of interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of a data packet, and does not need to participate in processing of the dial-up packet. This implements decoupling of a forwarding plane and a control plane in real sense, and facilitates deployment and operations and maintenance of a carrier network.

The first communication tunnel is used by the access gateway to: when the access gateway receives a data packet whose source IP address is the IP address, determine, based on the IP address, the first communication tunnel corresponding to the IP address; and transmit the data packet to the forwarding plane network element through the first communication tunnel.

It may be understood that, after the tunnel is established between the access gateway and the forwarding plane network element, when the user equipment sends a data packet to the access gateway again, the access gateway may directly send the data packet to the target forwarding plane network element through the communication tunnel, so that the user equipment can directly forward the data packet through the target forwarding plane network element that matches an SLA level of the user equipment. Therefore, packet forwarding efficiency is improved.

In an embodiment, when the IP address has been in a correspondence with a second communication tunnel, the receiving unit is further configured to receive the information that is about the forwarding plane network element and that is sent by the control plane network element; the generation unit is further configured to generate a tunnel switch request based on the information about the forwarding plane network element, where the tunnel switch request is used to switch a communication tunnel corresponding to the IP address from the second communication tunnel to the first communication tunnel, and the second communication tunnel is a communication tunnel between the access gateway and another forwarding plane network element; and the sending unit is further configured to send the tunnel switch request to the access gateway.

It may be understood that, when the user equipment sends a dial-up packet for the first time, if the AGW sends the dial-up packet to the control plane network element, because the SLA level of the user equipment is low, the control plane network element determines to use a UP 1 to forward a data packet of the user equipment. Assuming that a user is not satisfied with a current network service, after the SLA level is changed to a high level, the user equipment sends the dial-up packet for the second time. After receiving the dial-up packet for the second time, the AGW also sends the packet to the control plane network element, the control plane network element determines to use a UP 2 to forward a data packet of the user equipment. The forwarding plane network element does not need to participate in the two dial-up packet processing processes, so that processing pressure of the forwarding plane network element is greatly reduced.

In an embodiment, the information about the forwarding plane network element includes the interface information of the forwarding plane network element and interface information of the access gateway. Specifically, after the AGW receives the tunnel establishment request, the AGW may determine, based on the information that is about the forwarding plane network element and that is in the tunnel establishment request, the tunnel to the target forwarding plane network element, and map port information of the user equipment to the tunnel based on the port information that is of the user equipment and that is in the tunnel establishment request.

It should be noted that the information about the forwarding plane network element may include the interface information of the AGW and the interface information of the forwarding plane network element, and may further include the port information of the user equipment. For example, a format of the information about the forwarding plane network element may be as follows: AGW_ID/ANI_slot/ANI_subslot/ANI_port/VLAN_ID/QINQ_ID, NAS_UpIdentifier/NAS_slot/NAS_subslot/NAS_port: SVLAN. CVLAN. AGW_ID/ANI_slot/ANI_subslot/ANI_port/VLAN_ID/QINQ_ID is access information of the user equipment and ID information of the AGW, and NAS_UpIdentifier/NAS_slot/NAS_subslot/NAS_port: SVLAN. CVLAN indicates the interface information of the forwarding plane network element, where NAS_UpIdentifier indicates a name of the forwarding plane network element, which is followed by slot, subslot, port, and VLAN information of the forwarding plane network element.

In an embodiment, the dial-up success information includes the service level agreement SLA information corresponding to the IP address, and the forwarding plane network element is determined based on the SLA information in the dial-up success information returned by the external server, after the control plane network element generates an authentication request based on the dial-up packet and sends the authentication request to the external server.

It may be understood that a user having a high SLA level is a high-priority user, and a forwarding plane network element of a light-loaded and high-quality network may be bound to the user, to forward a data packet for the user. A user having a low SLA level is a low-priority user. A forwarding plane network element of a high-loaded and low-quality network may be bound to the user, to forward a packet for the user. Therefore, the forwarding plane network element determined based on the SLA information of the user is a forwarding plane network element that best satisfies a user requirement, and the port information of the user equipment is mapped to the tunnel between the AGW and the forwarding plane network element, so that each time the user equipment sends a data packet, the AGW may directly send, through the tunnel, the data packet of the user equipment to the forwarding plane network element corresponding to the SLA information of the user. Therefore, user experience is improved.

According to a fourth aspect, a dial-up packet processing method is provided. The method is applied to a dial-up packet processing system. The system includes a controller, an access gateway, a forwarding plane network element, and a control plane network element that are connected to each other. The forwarding plane network element may be a conventional hardware network device, is briefly referred to as a physical forwarding plane network element (Physical User Plane, pUP) or a virtual session forwarding processing unit (Virtual Session Forward Unit, vSFU), or may be a virtual device implemented based on a general-purpose physical server with reference to a network functions virtualization NFV technology, and is briefly referred to as a virtual forwarding plane network element (Virtual User Plane, vUP) or a virtual session forwarding processing unit (Virtual Session Forward Unit, vSFU). The vUP device or the vSFU is a virtual network device. The virtual network device may be a virtual machine (VM) that can implement functions of the foregoing control plane network element. The virtual machine is deployed on a hardware device (for example, a physical server such as an X86 server). The virtual machine is a complete computer system, obtained through software simulation, that runs in a completely isolated environment and has a complete hardware system function. By reading this application, a person skilled in the art may virtualize, on a general-purpose physical server with reference to the NFV technology, one or more vSFU devices or vUP devices having the foregoing function. The method includes:

The forwarding plane network element receives a tunnel establishment request from the access gateway, where the tunnel establishment request is used to establish a communication tunnel between the access gateway and the forwarding plane network element, and the tunnel establishment request is generated by the controller based on information that is about the forwarding plane network element and that is sent by the control plane network element after the control plane network element determines the forwarding plane network element after receiving a dial-up packet sent by user equipment, where the dial-up packet includes an internet protocol IP address of the user equipment.

The forwarding plane network element establishes the communication tunnel to the access gateway, where the communication tunnel is in a correspondence with the IP address.

In the foregoing method, after receiving the dial-up packet, the access gateway sends the dial-up packet to the control plane network element for processing. After interacting with an external server to obtain dial-up success information, the control plane network element may determine the target forwarding plane network element based on SLA information in the dial-up success information, and notifies the controller of interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of a data packet, and does not need to participate in processing of the dial-up packet. This implements decoupling of a forwarding plane and a control plane in real sense, and facilitates deployment and operations and maintenance of a carrier network.

In an embodiment, the information about the forwarding plane network element includes the interface information of the forwarding plane network element and interface information of the access gateway. Specifically, after the AGW receives the tunnel establishment request, the AGW may determine, based on the information that is about the forwarding plane network element and that is in the tunnel establishment request, the tunnel to the target forwarding plane network element, and map port information of the user equipment to the tunnel based on the port information that is of the user equipment and that is in the tunnel establishment request.

It should be noted that the information about the forwarding plane network element may include the interface information of the AGW and the interface information of the forwarding plane network element, and may further include the port information of the user equipment. For example, a format of the information about the forwarding plane network element may be as follows: AGW_ID/ANI_slot/ANI_subslot/ANI_port/VLAN_ID/QINQ_ID, NAS_UpIdentifier/NAS_slot/NAS_subslot/NAS_port: SVLAN. CVLAN. AGW_ID/ANI_slot/ANI_subslot/ANI_port/VLAN_ID/QINQ_ID is access information of the user equipment and ID information of the AGW, and NAS_UpIdentifier/ NAS_slot/NAS_subslot/NAS_port: SVLAN. CVLAN indicates the interface information of the forwarding plane network element, where NAS_UpIdentifier indicates a name of the forwarding plane network element, which is followed by slot, subslot, port, and VLAN information of the forwarding plane network element.

In an embodiment, the dial-up success information includes the service level agreement SLA information corresponding to the IP address, and the forwarding plane network element is determined based on the SLA information in the dial-up success information returned by the external server, after the control plane network element generates an authentication request based on the dial-up packet and sends the authentication request to the external server.

It may be understood that, when the user equipment sends a dial-up packet for the first time, if the AGW sends the dial-up packet to the control plane network element, because an SLA level of the user equipment is low, the control plane network element determines to use a UP 1 to forward a data packet of the user equipment. Assuming that a user is not satisfied with a current network service, after the SLA level is changed to a high level, the user equipment sends the dial-up packet for the second time. After receiving the dial-up packet for the second time, the AGW also sends the packet to the control plane network element, the control plane network element determines to use a UP 2 to forward a data packet of the user equipment. The forwarding plane network element does not need to participate in the two dial-up packet processing processes, so that processing pressure of the forwarding plane network element is greatly reduced.

In an embodiment, the method further includes: The forwarding plane network element receives the data packet from the access gateway through the communication tunnel, where a source IP address of the data packet is the IP address.

It may be understood that, after the tunnel is established between the access gateway and the forwarding plane network element, when the user equipment sends a data packet to the access gateway again, the access gateway may directly send the data packet to the target forwarding plane network element through the communication tunnel, so that the user equipment can directly forward the data packet through the target forwarding plane network element that matches the SLA level of the user equipment. Therefore, packet forwarding efficiency is improved.

In an embodiment, the method further includes: The forwarding plane network element receives session information sent by the control plane network element, where the session information is generated by the forwarding plane network element based on the dial-up success information returned by the external server, and the session information corresponds to the IP address; and the forwarding plane network element publishes routing information to the outside based on the session information, where a destination address of the routing information is the IP address.

It may be understood that the destination address of the routing information is the IP address corresponding to the user equipment, so that after again receiving a data packet sent by the user equipment, the target forwarding plane network element may determine a next-hop IP address of the data packet based on a destination IP address of the data packet and the routing information, to forward the data packet of the user equipment.

According to a fifth aspect, a dial-up packet processing system is provided. The system includes a controller, an access gateway, a forwarding plane network element, and a control plane network element that are connected to each other. The control plane network element performs the method described in the first aspect, the access gateway performs the method described in the second aspect, the controller performs the method described in the third aspect, and the forwarding plane network element performs the method described in the fourth aspect.

According to a sixth aspect, a control plane network element is provided. The control plane network element is used in a dial-up packet processing system. The system includes a controller, an access gateway, a forwarding plane network element, and the control plane network element that are connected to each other. The control plane network element includes a receiving unit, a sending unit, and a processing unit.

The receiving unit is configured to receive a dial-up packet from the access gateway, where the dial-up packet is a dial-up packet sent by user equipment to the access gateway.

The sending unit is configured to send an authentication request to an external server, where the authentication request is generated by the control plane network element based on the dial-up packet.

The receiving unit is further configured to receive dial-up success information sent by the external server.

The processing unit is configured to determine the forwarding plane network element based on the dial-up success information, so that the user equipment performs network communication through the forwarding plane network element.

In an embodiment, the dial-up packet includes an internet protocol IP address of the user equipment, and the sending unit is further configured to: after the processing unit determines the forwarding plane network element based on the dial-up success information, the sending unit is further configured to send information about the forwarding plane network element to the controller, so that the controller sends a tunnel establishment request to the access gateway, where the tunnel establishment request is generated by the controller based on the information about the forwarding plane network element, the tunnel establishment request is used to establish a first communication tunnel between the access gateway and the forwarding plane network element, and the first communication tunnel is in a correspondence with the IP address.

In an embodiment, the information about the forwarding plane network element includes interface information of the forwarding plane network element and interface information of the access gateway.

In an embodiment, when the IP address has been in a correspondence with a second communication tunnel, the sending unit is further configured to: after the processing unit determines the forwarding plane network element based on the dial-up success information, send the information about the forwarding plane network element to the controller, so that the controller sends a tunnel switch request to the access gateway, where the tunnel switch request is generated by the controller based on the information about the forwarding plane network element, the tunnel switch request is used to switch a communication tunnel corresponding to the IP address from the second communication tunnel to the first communication tunnel, and the second communication tunnel is a communication tunnel between the access gateway and another forwarding plane network element.

In an embodiment, the dial-up success information includes service level agreement SLA information corresponding to the IP address, and the processing unit is configured to determine the forwarding plane network element based on the SLA information.

In an embodiment, the processing unit is further configured to: after the receiving unit receives the dial-up success information sent by the external server, generate, by the control plane network element, session information based on the dial-up success information, where the session information corresponds to the IP address; and the sending unit is further configured to send the session information to the forwarding plane network element, so that the forwarding plane network element publishes routing information to the outside based on the session information, where a destination address of the routing information is the IP address.

According to a seventh aspect, an access gateway is provided. The access gateway is used in a dial-up packet processing system. The system includes a controller, the access gateway, a forwarding plane network element, and a control plane network element that are connected to each other. The access gateway includes a sending unit, a receiving unit, and an establishment unit.

The receiving unit is configured to receive a sent dial-up packet sent by user equipment, where the dial-up packet includes an internet protocol IP address of the user equipment.

The sending unit is configured to send the dial-up packet to the control plane network element.

The receiving unit is further configured to receive a tunnel establishment request from the controller, where the tunnel establishment request is used to establish a communication tunnel between the access gateway and the forwarding plane network element.

The establishment unit is configured to establish a first communication tunnel to the forwarding plane network element based on the tunnel establishment request, where the first communication tunnel is in a correspondence with the IP address.

In an embodiment, the forwarding plane network element is determined by the control plane network element based on dial-up success information returned by an external server, after the control plane network element generates an authentication request based on the dial-up packet and sends the authentication request to the external server; and the tunnel establishment request is generated by the controller based on information that is about the forwarding plane network element and that is sent by the control plane network element.

In an embodiment, the dial-up success information includes service level agreement SLA information corresponding to the IP address, and the forwarding plane network element is determined based on the SLA information in the dial-up success information returned by the external server, after the control plane network element generates the authentication request based on the dial-up packet and sends the authentication request to the external server.

In an embodiment, the information about the forwarding plane network element includes interface information of the forwarding plane network element and interface information of the access gateway.

In an embodiment, when the IP address has been in a correspondence with a second communication tunnel, the receiving unit is further configured to receive a tunnel switch request from the controller, where the tunnel switch request is generated by the controller based on the information about the forwarding plane network element; and the establishment unit is further configured to switch a communication tunnel corresponding to the IP address from the second communication tunnel to the first communication tunnel, where the second communication tunnel is a communication tunnel between the access gateway and another forwarding plane network element.

In an embodiment, the receiving unit is further configured to receive a data packet, where a source IP address of the data packet is the IP address; the sending unit is further configured to determine, based on the IP address, the first communication tunnel corresponding to the IP address; and the sending unit is further configured to transmit the data packet to the forwarding plane network element through the first communication tunnel.

According to an eighth aspect, a controller is provided. The controller is used in a dial-up packet processing system. The system includes the controller, an access gateway, a forwarding plane network element, and a control plane network element that are connected to each other. The controller includes a receiving unit, a generation unit, and a sending unit.

The receiving unit is configured to receive information that is about the forwarding plane network element and that is sent by the control plane network element, where the information about the forwarding plane network element is determined by the control plane network element after the control plane network element receives a dial-up packet that is of user equipment and that is sent by the access gateway, and the dial-up packet includes an internet protocol IP address of the user equipment.

The generation unit is configured to generate a tunnel establishment request based on the information about the forwarding plane network element, where the tunnel establishment request is used to establish a communication tunnel between the access gateway and the forwarding plane network element.

The sending unit is configured to send the tunnel establishment request to the access gateway, so that the access gateway establishes a first communication tunnel to the forwarding plane network element based on the tunnel establishment request, where the first communication tunnel is in a correspondence with the IP address.

In an embodiment, the first communication tunnel is used by the access gateway to: when the access gateway receives a data packet whose source IP address is an IP address, determine, based on the IP address, the first communication tunnel corresponding to the IP address, and transmit the data packet to the forwarding plane network element through the first communication tunnel.

In an embodiment, when the IP address has been in a correspondence with a second communication tunnel, the receiving unit is further configured to receive the information that is about the forwarding plane network element and that is sent by the control plane network element; the generation unit is further configured to generate a tunnel switch request based on the information about the forwarding plane network element, where the tunnel switch request is used to switch a communication tunnel corresponding to the IP address from the second communication tunnel to the first communication tunnel, and the second communication tunnel is a communication tunnel between the access gateway and another forwarding plane network element; and the sending unit is further configured to send the tunnel switch request to the access gateway.

In an embodiment, the information about the forwarding plane network element includes interface information of the forwarding plane network element and interface information of the access gateway.

In an embodiment, dial-up success information includes service level agreement SLA information corresponding to the IP address, and the forwarding plane network element is determined based on the SLA information in the dial-up success information returned by an external server, after the control plane network element generates an authentication request based on the dial-up packet and sends the authentication request to the external server.

According to a ninth aspect, a forwarding plane network element is provided. The forwarding plane network element is used in a dial-up packet processing system. The system includes a controller, an access gateway, the forwarding plane network element, and a control plane network element that are connected to each other. The forwarding plane network element includes a receiving unit and an establishment unit.

The receiving unit is configured to receive a tunnel establishment request from the access gateway, where the tunnel establishment request is used to establish a communication tunnel between the access gateway and the forwarding plane network element, and the tunnel establishment request is generated by the controller based on information that is about the forwarding plane network element and that is sent by the control plane network element after the control plane network element determines the forwarding plane network element after receiving a dial-up packet sent by user equipment, where the dial-up packet includes an internet protocol IP address of the user equipment.

The establishment unit is configured to establish the communication tunnel to the access gateway, where the communication tunnel is in a correspondence with the IP address.

In an embodiment, the information about the forwarding plane network element includes interface information of the forwarding plane network element and interface information of the access gateway.

In an embodiment, dial-up success information includes service level agreement SLA information corresponding to the IP address, and the forwarding plane network element is determined based on the SLA information in the dial-up success information returned by an external server, after the control plane network element generates an authentication request based on the dial-up packet and sends the authentication request to the external server.

In an embodiment, the receiving unit is further configured to receive a data packet from the access gateway through the communication tunnel, where a source IP address of the data packet is the IP address.

In an embodiment, the forwarding plane network element further includes a publishing unit, and the receiving unit is further configured to receive session information sent by the control plane network element, where the session information is generated by the forwarding plane network element based on the dial-up success information returned by the external server, and the session information corresponds to the IP address; and the publishing unit is configured to publish routing information to the outside based on the session information, where a destination address of the routing information is the IP address.

According to a tenth aspect, a dial-up packet processing system is provided. The system includes a controller, a forwarding plane network element, and a control plane network element that are connected to each other. The control plane network element performs the method described in the first aspect, the controller performs the method described in the third aspect, and the forwarding plane network element performs the method described in the fourth aspect.

In an embodiment, the system further includes an access gateway. The access gateway is connected to the controller, the control plane network element, and the forwarding plane network element. The access gateway performs the method described in the second aspect.

According to an eleventh aspect, a computer-readable storage medium is provided. The computer-readable storage medium includes instructions. When the instructions are run on a computing device, the computing device is enabled to perform the methods described in the first aspect, the second aspect, the third aspect, and the fourth aspect.

According to a twelfth aspect, a network device is provided. The network device includes a processor and a memory, and the processor executes code in the memory to perform the methods described in the first aspect, the second aspect, the third aspect, and the fourth aspect.

According to a thirteenth aspect, a computer program product is provided. When the computer program product runs on a network device, the network device is enabled to perform the methods described in the first aspect, the second aspect, the third aspect, and the fourth aspect.

According to a fourteenth aspect, a chip is provided. When the chip runs on a network device, the network device is enabled to perform the methods described in the first aspect, the second aspect, the third aspect, and the fourth aspect.

BRIEF DESCRIPTION OF DRAWINGS

To describe technical solutions in embodiments of this application or in a conventional technology more clearly, the following briefly describes the accompanying drawings for describing the embodiments or the conventional technology.

DESCRIPTION OF EMBODIMENTS

The following describes the technical solutions in embodiments of the present invention with reference to the accompanying drawings in embodiments of the present invention. It is clear that the described embodiments are merely some rather than all of embodiments of the present invention. All other embodiments obtained by a person of ordinary skill in the art based on embodiments of the present invention without creative efforts shall fall within the protection scope of the present invention.

The following describes application scenarios in this application.

In recent years, with rapid development of network technologies, people are increasingly dependent on the network technologies. The Internet has penetrated into thousands of households. Almost all consumption places, such as shopping malls, restaurants, hotels, and cafes, provide wireless services for their customers, and almost all homes, offices, schools, and other places are covered with wired services. Internet access has become an important part of most people's study, work, and life.

Generally, if a user wants to access a network, the user needs to perform dial-up access. Dial-up access means that user equipment applies to a local Internet service provider (Internet Service Provider, ISP) for an account of the user equipment or purchases an Internet access card, and after having a user name and a password of the user equipment, the user equipment sends a dial-up packet to an authentication, authorization and accounting (Authentication, Authorization and Accounting, AAA) server. When the AAA verifies that the dial-up succeeds, the user equipment can use various services in a network.

Figure 1:
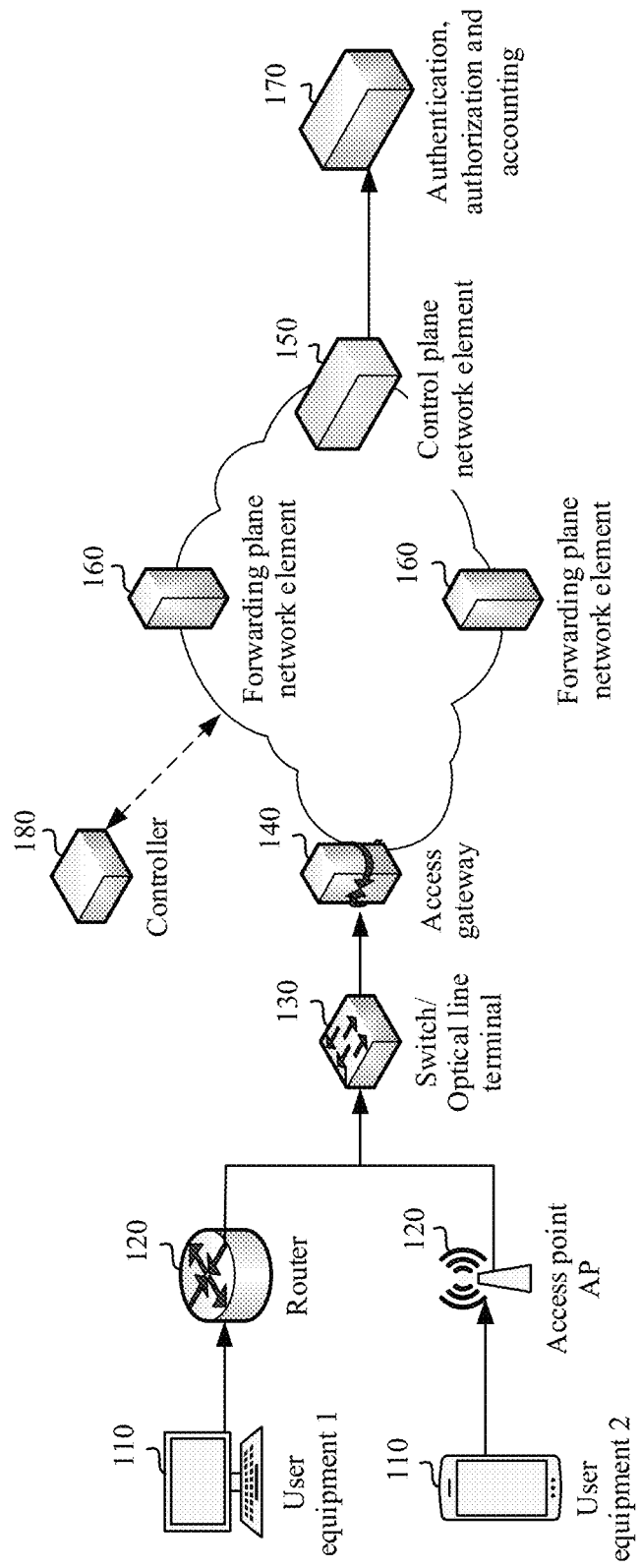
FIG. 1 is a schematic diagram of a structure of a dial-up packet processing system.

FIG. 1 is a schematic diagram of a structure of a dial-up packet processing system. As shown in FIG. 1, after accessing a carrier network by connecting to a wireless access point (AP) or a router 120, each of various types of user equipments 110 may send a dial-up packet to an AAA 170 through the network, and the AAA 170 may determine, based on the dial-up packet, whether a user has access permission, provide a network service for a user having the access permission, and return a dial-up success message to the user equipment, so that the user equipment 110 can use the network to handle official business, perform communication, perform entertainment, and the like; otherwise, dial-up fails, and although the user is connected to the network, the user cannot use various network services in the network. Devices participating in a user dial-up process in the network include at least the user equipment 110, the AP or the router 120, a switch or an optical line terminal (OLT) 130, an access gateway (AGW) 140, a control plane network element (Control Plane, CP) 150, a forwarding plane network element or user plane network element (User Plane, UP) 160, the AAA server 170, and a controller 180 shown in FIG. 1. It should be understood that in FIG. 1, two user equipments 110, two APs, one router, one switch or optical line terminal 130, one AGW 140, one control plane network element 150, two forwarding plane network elements, one AAA, and one controller are merely used as an example for description. In a specific implementation, quantities of various devices in the dial-up packet processing system may be determined based on an actual situation. This is not specifically limited in this application.

The user equipment 110 may be a mobile terminal, and may be specifically a wireless electronic device that can be connected to the AP, may be a wired electronic device that can be connected to the router, or may be an electronic device that can be connected to both the AP and the router. The electronic device may be specifically a smartphone, a handheld processing device, a tablet computer, a personal computer, a mobile notebook computer, a virtual reality device, an integrated handheld device, a vehicle-mounted device, an intelligent conference device, an intelligent advertising device, an intelligent appliance, a wearable device, or the like.

In the AP or the router 120, the AP is an access point for accessing a wired network through a wireless device, is a bridge between the wireless network and the wired network, and is usually connected to a wired switch or a router, so that the wireless device accessing the AP may be connected to the wired switch or the router through the wireless AP. APs are mainly used in places, such as broadband homes, buildings, campuses, warehouses, and factories, that require wireless networks. The APs not only include a pure wireless access point (wireless switch), but also may be a generic term of devices, for example, a wireless router (including a wireless gateway and a wireless bridge) that has a routing function and can establish independent wireless home networking, and the like. The router is a hardware device that connects two or more networks. The router functions as a gateway between the networks and is used to connect a non-transmission control protocol/Internet protocol (TCP/IP) network to the Internet. The router is a dedicated intelligent network device that reads an address in each data packet and determines how to transmit the data packet. Generally, the router 130 can understand different forwarding protocols. For example, if a local area network uses the Ethernet protocol, and the Internet uses the TCP/IP protocol, a router between the Ethernet and the Internet may analyze a destination address of a data packet transmitted from the local area network, convert an address of the local area network into a TCP/IP address, and then transmit the data packet to the TCP/IP address along an optimal route based on a selected routing algorithm, and vice versa. Details are not described herein again.

The switch in the switch or the optical line terminal (OLT) 130 is a network device configured to forward an electrical signal. The switch may provide an exclusive electrical signal channel for any two network nodes that access the switch. The switch may be specifically an Ethernet switch, a telephone voice switch, an optical fiber switch, or the like. The OLT may be a network device for forwarding an optical signal, may provide a network side interface of an optical access network (OAN), and is connected to one or more optical distribution networks (ODNs); or may be connected to a front-end switch through a network cable, to convert an electrical signal into an optical signal. The OLT is a core component of the optical access network, and is equivalent to a switch or a router in a conventional communication network, and provides an optical fiber interface of a passive fiber optic network for a user.

The access gateway AGW 140 is a network interconnection device, used for interconnection between two networks having different upper-layer protocols, and used between two systems having different communication protocols, data protocols, or languages, or even two systems having completely different architectures. The AGW 140 may be simply understood as a translator, and the gateway needs to repack and translate received information, to satisfy a requirement of a destination system.

The control plane network element 150 and the forwarding plane network element 160 may be obtained after a forwarding plane and a control plane of a BNG are separated. The BNG is configured to perform operations such as user dial-up authentication, access control, and traffic scheduling in the network. In short, after a dial-up packet sent by the user equipment 110 passes through the AGW 140, the BNG needs to interact with the AAA 170 to determine whether a user has permission to access the network. If the user has permission to access the network, the BNG stores an IP address and routing information that correspond to the user equipment. Then, when the BNG receives a data packet sent by the user equipment, the BNG may forward, based on a source IP address and a destination IP address of the packet and in combination with the routing information, the data packet to a router or a switch corresponding to a next-hop IP address for route forwarding. With development of software-defined networking (SDN) and network functions virtualization (NFV) technologies, a metropolitan area network evolves from a conventional network-centric architecture to a data center-centric network architecture, and a conventional network element device gradually evolves toward decoupling of a forwarding plane and a control plane. After forwarding and control of the BNG are decoupled, one or more BNGs may be separated into one or more control plane network elements 150 and one or more forwarding plane network elements 160. One control plane network element 150 may control and manage a plurality of forwarding plane network elements 160 together, so that the forwarding plane network element 160 may forward, under management of the control plane network element 150, a packet sent by the user equipment. Ideally, when a forwarding plane and a control plane are completely decoupled, the forwarding plane network element processes only a forwarding task of forwarding a user data packet, and the control plane network element processes remaining non-forwarding tasks, such as resource scheduling, user authentication, charging, and authorization. In this way, forwarding and control are completely decoupled. This greatly facilitates deployment and operations and maintenance of a carrier. In comparison with a single BNG, device utilization and reliability are greatly improved. The following separately describes the forwarding plane network element 160 and the control plane network element 150.

The control plane network element 150 is configured to manage a plurality of forwarding plane network elements 160 together. For example, after receiving a dial-up packet sent by the forwarding plane network element 160, the control plane network element 150 interacts with the AAA 300 to perform user authentication, charging, and authorization, and after dial-up succeeds, the control plane network element 150 delivers session information to the forwarding plane network element 160, so that the forwarding plane network element 160 can forward, based on the session information, a data packet sent by a user whose dial-up succeeds. The session information is used to store authentication information that needs to be stored when user equipment corresponding to each IP address performs data communication (that is, is in a session) with the forwarding plane network element. For example, a user name, a MAC address, the IP address, bandwidth, a value-added service, an inaccessible address list (List), and routing information of the user equipment corresponding to each IP address are stored. The routing information may include a path pointing to a specific network address, and indicates the forwarding plane network element to route and forward a data packet. The routing information may be information such as a routing table or a routing information base (RIB), for example, a destination address, a network mask, an output interface, or a next-hop IP address. This is not limited in this application. The control plane network element 150 is usually a virtualized network element, and therefore is also referred to as a vBNG-CP or a virtual session control unit (vSCU). In a specific implementation, the vBNG-CP or the vSCU may be implemented by using a cloudification technology. A cloudified vBNG-CP or vSCU may include a plurality of virtual machines (VMs) deployed on a physical server, and the plurality of VMs may be managed together by a hypervisor running on the physical server. One vBNG-CP or vSCU may manage a plurality of physical forwarding plane network elements (Physical User Planes, pUPs) and virtual forwarding plane network elements (Virtual User Planes, vUPs).

The forwarding plane network element 160 is mainly configured to forward, based on the session information delivered by the control plane network element 150, the data packet sent by the user equipment 110. The forwarding plane network element 160 may be a virtualized network element, or may be a physical device. When the forwarding plane network element 160 is the virtualized network element, the forwarding plane network element 160 may be referred to as a vUP or a virtual session forwarding processing unit (Virtual Session Forward Unit, vSFU) for short, and may be specifically a virtualized network function (VNF) running on an X86 server. When the forwarding plane network element 160 is the physical device, the forwarding plane network element may be referred to as a pUP or a physical session forwarding processing unit (Physical Session Forward Unit, pSFU) for short, and may be specifically a conventional hardware network device. A specific form of the forwarding plane network element 160 is not limited in this application.

Figure 2:
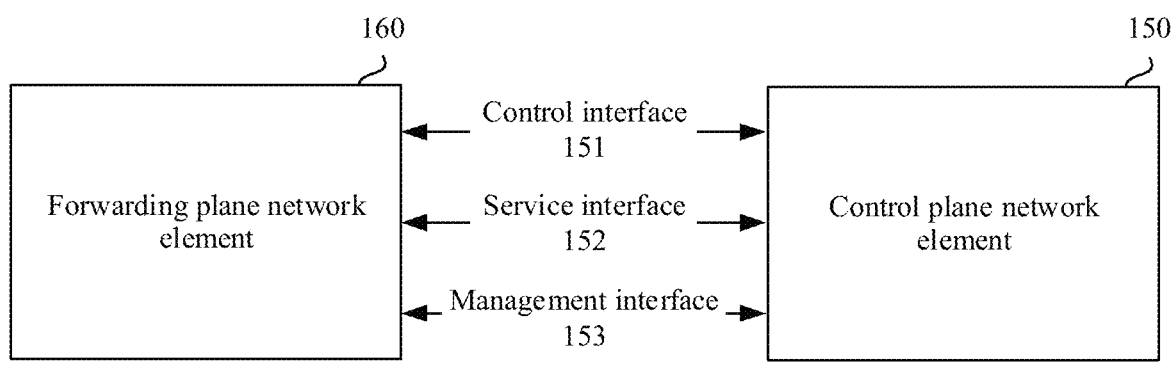
FIG. 2 is a schematic diagram of structures of a forwarding plane network element and a control plane network element.

FIG. 2 is a schematic diagram of internal structures of the control plane network element 150 and the forwarding plane network element 160 in the network shown in FIG. 1. It should be understood that, although unit and module division is not performed on the control plane network element 150 and the forwarding plane network element 160 in FIG. 2, in a specific implementation, there may be a plurality of forms of unit and module division inside the control plane network element 150 and the forwarding plane network element 160, and modules may be software modules, may be hardware modules, or may be some software modules and some hardware modules. This is not limited in this application.

As shown in FIG. 2, the control plane network element 150 and the forwarding plane network element 160 may perform data communication through three interfaces. The three interfaces are respectively a control interface 151, a service interface 152, and a management interface 153. The service interface 152 may be a generic protocol extension for virtual extensible local area network (Generic Protocol Extension for VXLAN, VXLAN-GPE) interface. When receiving a dial-up packet of a user, the forwarding plane network element 160 may encapsulate the dial-up packet through the service interface 152 and send the encapsulated dial-up packet to the control plane network element 150 for processing. The control interface 151 may be an interface of an Control Plane and User Plane Separation Protocol (CUSP) of a Broadband Remote Access Server (BRAS). After the control plane network element 150 receives the dial-up packet sent by the forwarding plane network element 160 through the service interface 152, if dial-up succeeds, the control plane network element 150 may deliver session information to the forwarding plane network element 160 through the control interface 151. The management interface 153 is a network configuration protocol (Netconf) interface. The control plane network element 150 may deliver some configurations, for example, configuration data of a virtual local area network (VLAN) or a virtual private network (VPN), through the interface to the forwarding plane network element 160. The forwarding plane network element

160 may further report some running statuses, for example, whether the forwarding plane network element 160 is currently in a faulty state, or whether a quantity of sessions stored in the forwarding plane network element 160 reaches a threshold, to the control plane network element 150 through the management interface 153. It should be understood that the foregoing three interfaces are merely used as an example for description. Data communication may be performed between the control plane network element 150 and the forwarding plane network element 160 through more or fewer interfaces based on an actual situation. This is not specifically limited in this application.

The AAA 170 is a server program that participates in processing a user dial-up packet, provides authentication, authorization, and accounting services, and mainly aims to manage user access to a network server and provide a service for a user having access permission. AAA is short for authentication, authorization and accounting. Authentication refers to checking whether a user can obtain network access permission. Authorization refers to authorizing a user to use particular network services. Accounting refers to recording network resource usage of a user. The AAA 170 usually supports processing a user dial-up packet according to RADIUS, which is an open standard commonly used in the industry, to ensure compatibility of devices of different vendors. When the user equipment 110 sends a dial-up packet to the AAA 170, a network access server (namely, the control plane network element 150 in the foregoing content) exchanges a RADIUS message with the AAA 170. If authentication succeeds, the user equipment can access a protected network resource.

The controller 180 may be specifically an SDN controller, and is used in an SDN network in which a control plane is separated from a forwarding plane. In the network, the AGW 140 and the switch transfer a control right of a forwarding rule to the controller 180, and the AGW 140 and the switch forward a data packet according to only the forwarding rule delivered by the controller 180. The controller 180 is a programmable controller, can master global network information, and is responsible for network traffic control, so as to implement flexible network traffic control, facilitate network management and configuration, deployment of a new protocol, and the like for a carrier and scientific research personnel, and make the network more intelligent.

Therefore, as shown in FIG. 2, in the network shown in FIG. 1, an entire processing procedure in which user equipment 1 sends a dial-up packet and dial-up succeeds may include the following steps.

S210: The AGW 140 sends a dial-up packet to the forwarding plane network element 160. The dial-up packet may be a dial-up packet sent by the switch or the OTL 130 to the AGW 140 after the user equipment 1 sends the dial-up packet to the switch or the OTL 130 through the AP or the router 120. The dial-up packet may include information such as an IP address, a user name, and a password that correspond to the user equipment 1. A user may use the user equipment 100 in advance to apply to a local ISP for an account of the user or purchase an Internet access card, to obtain the user name and the password that correspond to the user equipment.

S220: The forwarding plane network element 160 identifies the dial-up packet, and sends the dial-up packet to the control plane network element 150. Specifically, the forwarding plane network element 160 may encapsulate the dial-up packet through the service interface 152 shown in FIG. 2, and send the encapsulated dial-up packet to the control plane network element 150 for processing. It can be learned from the foregoing content that one control plane network element 150 may manage one or more forwarding plane network elements 160. Therefore, after receiving the dial-up packet, the AGW usually sends the dial-up packet to each default forwarding plane network element specified in the network.

S230: The control plane network element 150 processes the dial-up packet to obtain an authentication request, and sends the authentication request to the AAA 160. The authentication request includes the user name and the password of the user equipment.

S240: The AAA 160 processes the authentication request, and obtains dial-up success information when authentication succeeds. The dial-up success information includes the user name, a corresponding service level agreement (SLA) level, and the IP address that correspond to the user equipment 1.

Specifically, a process of processing the authentication request by the AAA 160 may include: confirming whether the user name and the password in the dial-up packet are correct, whether the user has permission to access the network, and so on. If yes, it indicates that the dial-up succeeds. The AAA 310 may further confirm information, such as services, service level agreements (SLAs), and network resource usage records, that can be used for the IP address corresponding to the user name. The AAA 310 encapsulates the confirmed information into a dial-up success message, and returns the dial-up success message to the control plane network element 150. It may be understood that if not, it indicates that the user name and the password are incorrect or the user name has no access permission, and it indicates that the dial-up fails. The AAA 160 may return dial-up failure information to the control plane network element 150, so that the control plane network element 150 may return the dial-up failure information to the user equipment 1 sequentially through the forwarding plane network element 140, the AGW 140, the switch or the OTL 130, and the router or the AP 120. Details are not described herein again.

S250: The AAA 160 returns the dial-up success information to the control plane network element 150.

S260: The control plane network element 150 generates, based on the dial-up success information, session information corresponding to the IP address, and determines, based on SLA information of the user, the target forwarding plane network element corresponding to the IP address. It may be understood that a user having a high SLA level is a high-priority user, and a forwarding plane network element of a light-loaded and high-quality network may be bound to the user, to forward a data packet for the user. A user having a low SLA level is a low-priority user. A forwarding plane network element of a high-loaded and low-quality network may be bound to the user, to forward a packet for the user. It should be noted that the target forwarding plane network element herein and the default forwarding plane network element in step S220 may be a same network element, or may be different network elements, and may be specifically determined based on the SLA information of the user equipment.

Figure 3:
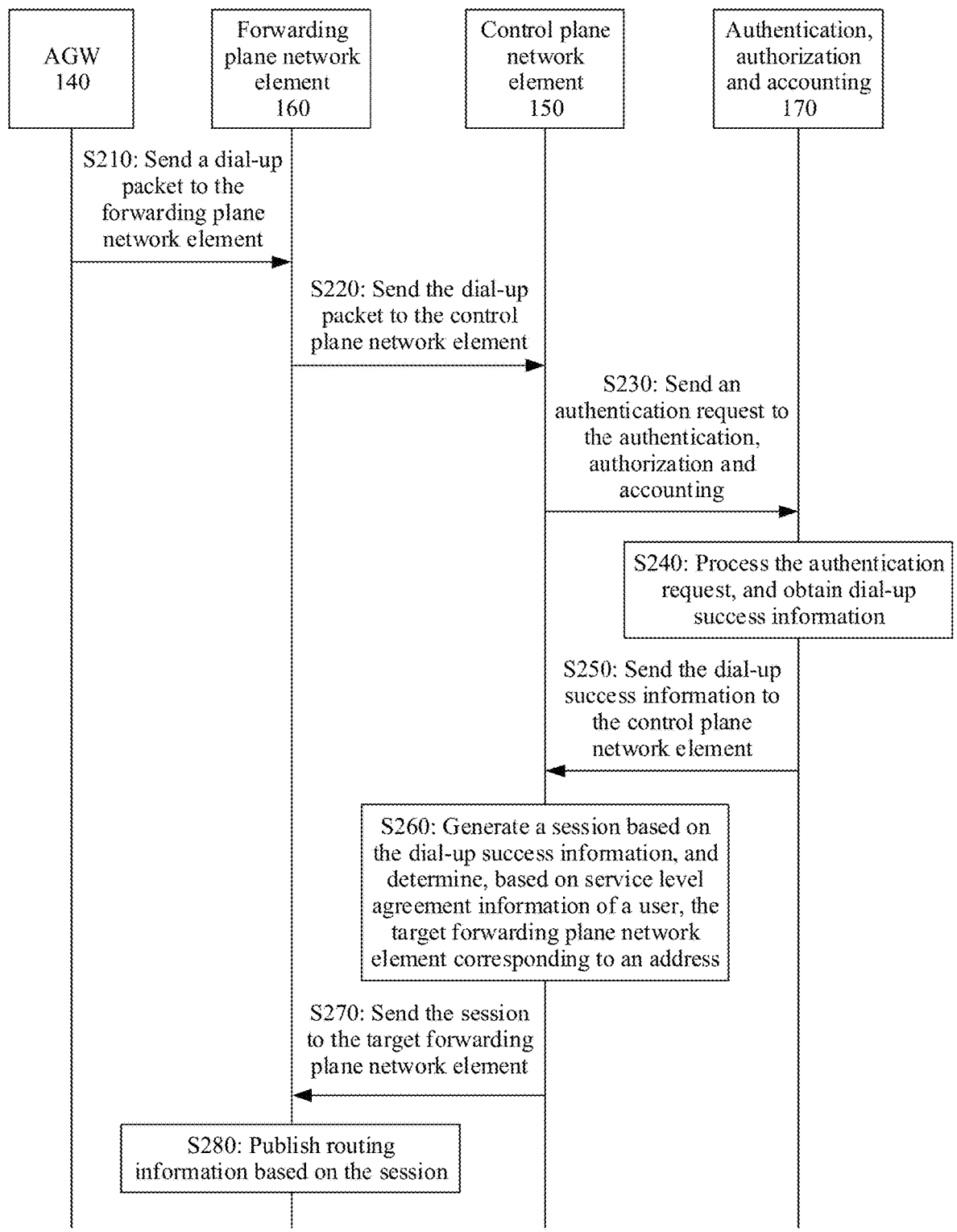
FIG. 3 is a schematic flowchart of a dial-up packet processing method.

S270: The control plane network element 150 sends the session information to the target forwarding plane network element. Specifically, the control plane network element 150 may deliver the session information to the forwarding plane network element 160 through the control interface 151 shown in FIG. 2. A flowchart shown in FIG. 3 is described by using a same network element as an example. This is not limited in this application.

S280: The target forwarding plane network element publishes routing information based on the session information, where a destination address of the routing information is the IP address corresponding to the user equipment 1, so that after again receiving a data packet sent by the user equipment 1, the target forwarding plane network element may determine a next-hop IP address of the data packet based on a destination IP address of the data packet and the routing information, to forward the data packet of the user equipment 1. The target forwarding plane network element may further store the session information corresponding to the IP address corresponding to the user equipment. This facilitates processing of some programs during a session, so that each time the target forwarding plane network element receives a data packet sent by the user equipment corresponding to the IP address, the target forwarding plane network element may determine, based on the session information corresponding to the IP address of the user equipment, whether the IP address corresponding to the user equipment has permission to use the network, whether the IP address corresponding to the user equipment has permission to use a value-added service in the network, SLA information, available network bandwidth, routing information required for forwarding the data packet sent by the user equipment, and the like, without needing to repeatedly send the authentication request to the AAA through the control plane network element 150, to verify various types of user information of the user equipment 100.

It may be understood that, if an SLA level of the user 1 is high, the target forwarding plane network element, for example, a UP 2 needs to be used to forward the data packet. Each time the user performs dial-up access, the AGW first sends the dial-up packet to the default forwarding plane network element, for example, a UP 1 in step S220, and the UP 1 sends the dial-up packet to the control plane network element to interact with the AAA. The control plane network element determines, based on the SLA information in the dial-up success information, to use the UP 2 to transmit the data packet of the user. Each time the user performs dial-up access, the dial-up packet is first transmitted to the UP 1 and then transmitted to the control plane network element, and the UP 2 is determined as the target forwarding plane network element. This brings extra processing pressure to the default forwarding plane network element UP 1.

In conclusion, in an ideal state of complete decoupling of a control plane and a forwarding plane of a BNG, the forwarding plane network element only forwards a user data packet. However, in the foregoing dial-up processing process, the forwarding plane network element still participates in the dial-up process. Each time the user performs dial-up access, the forwarding plane network element needs to participate in identification, encapsulation, and forwarding of the dial-up packet. Consequently, the forwarding plane network element is heavily loaded and has a high failure rate. In addition, incomplete decoupling of the forwarding plane and the control plane also affects network deployment and operations and maintenance processes of a carrier.

Figure 4:
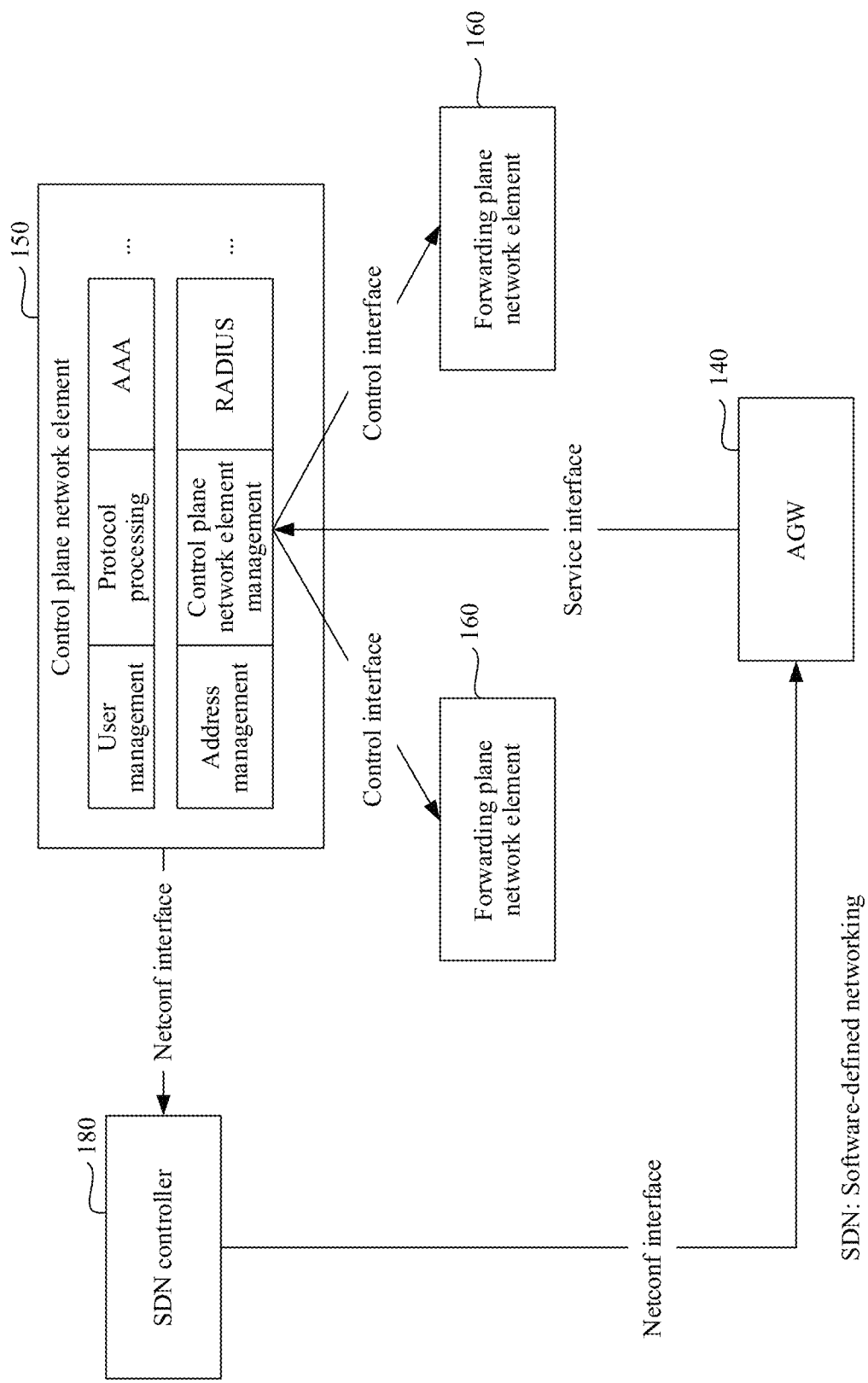
FIG. 4 is a schematic diagram of a structure of a dial-up packet processing system according to this application.

To resolve the foregoing problems of the high processing pressure of the forwarding plane network element and affected network deployment and operations and maintenance processes of the carrier that are caused by incomplete decoupling of the forwarding plane and the control plane of the BNG device because the forwarding plane network element needs to participate in the dial-up process, an embodiment of this application provides a dial-up packet processing system 400. As shown in FIG. 4, the system 400 may be used in the network system shown in FIG. 1. The dial-up packet processing system includes an access gateway (AGW) 140, a control plane network element (Control Plane) 150, a forwarding plane network element (User Plane) 160, and a controller 180. It should be understood that the internal division of the control plane network element 150 in FIG. 4 is an example division manner. The control plane network element 150 may further have a plurality of forms of unit and module division. Modules may be software modules, may be hardware modules, or may be some software modules and some hardware modules. This is not limited in this application.

After receiving a dial-up packet sent by user equipment, the AGW 140 may directly send the dial-up packet to the control plane network element 150 through a service interface. The service interface may be the service interface 432 described in the embodiment in FIG. 2.

After receiving the dial-up packet sent by the AGW 140, the control plane network element 150 may generate an authentication request based on the dial-up packet, and send the authentication request to the AAA 170; and when dial-up succeeds, obtain dial-up success information returned by the AAA 170, then determine, based on the dial-up success information, the forwarding plane network element corresponding to the user equipment, and deliver interface information of the forwarding plane network element to the controller. Specifically, the control plane network element 150 may determine, based on a user management module and an address management module in the control plane network element 150, whether the user equipment corresponding to the dial-up packet is a user that has gone online. If not, the control plane network element 150 first generates the authentication request based on the received dial-up packet by using a protocol processing module, a RADIUS module, and an AAA module, and then sends the authentication request to a RADIUS server through a RADIUS interface, to send a request for remotely accessing an authentication server (namely, the AAA 170), and then the AAA 170 performs authentication, accounting, and authorization, to obtain the dial-up success information. The control plane network element may then determine, based on SLA information by using a management module of the forwarding plane network element, the interface information of the forwarding plane network element corresponding to the user equipment, and send the interface information of the forwarding plane network element to the controller through a Netconf interface. The control plane network element may further generate session information based on the dial-up success information, and deliver the session information to the forwarding plane network element through a management interface. The management interface may be the management interface 431 described in the embodiment in FIG. 2.

The controller 170 may generate a tunnel establishment request based on the received interface information of the forwarding plane network element. The tunnel establishment request is used to establish a communication tunnel between the AGW 140 and the target forwarding plane network element. Then, the controller 170 may send the tunnel establishment request to the AGW 140. Specifically, the controller 170 may deliver the tunnel establishment request to the AGW 140 through the Netconf interface. The Netconf interface is an XML-based network configuration protocol interface. Management software may write configuration data into a device by using the Netconf protocol. It may be understood that, in this application, a configuration of the controller may be flexibly modified by using the Netconf interface, to enable the controller to send the tunnel establishment request to the AGW 140.

The forwarding plane network element 160 may establish the communication tunnel to the AGW 140 after the AGW 140 receives the tunnel establishment request, or may publish routing information based on the session information after receiving the session information delivered by the control plane network element 150 through the management interface. In this way, when the user equipment sends a data packet to the AGW 140, the AGW 140 may directly send the data packet to the forwarding plane network element 160 through the communication tunnel, and then the forwarding plane network element forwards the data packet based on the previously published routing information, so that the user equipment performs network communication through the forwarding plane network element. It may be understood that, when the user equipment sends a dial-up packet for the first time, if the AGW 140 sends the dial-up packet to the control plane network element 150, because an SLA level of the user equipment is low, the control plane network element 150 determines to use a UP 1 to forward a data packet of the user equipment. Assuming that a user is not satisfied with a current network service, after the SLA level is changed to a high level, the user equipment sends the dial-up packet for the second time. After receiving the dial-up packet for the second time, the AGW 140 also sends the packet to the control plane network element 150, the control plane network element determines to use a UP 2 to forward a data packet of the user equipment. The forwarding plane network element does not need to participate in the two dial-up packet processing processes, so that processing pressure of the forwarding plane network element is greatly reduced in comparison with the dial-up packet processing method in the embodiment in FIG. 3.

In conclusion, in the dial-up packet processing system provided in this embodiment of this application, after receiving the dial-up packet, the access gateway sends the dial-up packet to the control plane network element for processing. After interacting with an external server to obtain the dial-up success information, the control plane network element may determine the target forwarding plane network element based on the SLA information in the dial-up success information, and notifies the controller of the interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of the data packet, and does not need to participate in processing of the dial-up packet. This implements decoupling of a forwarding plane and a control plane in real sense, and facilitates deployment and operations and maintenance of a carrier network.

Figure 5:
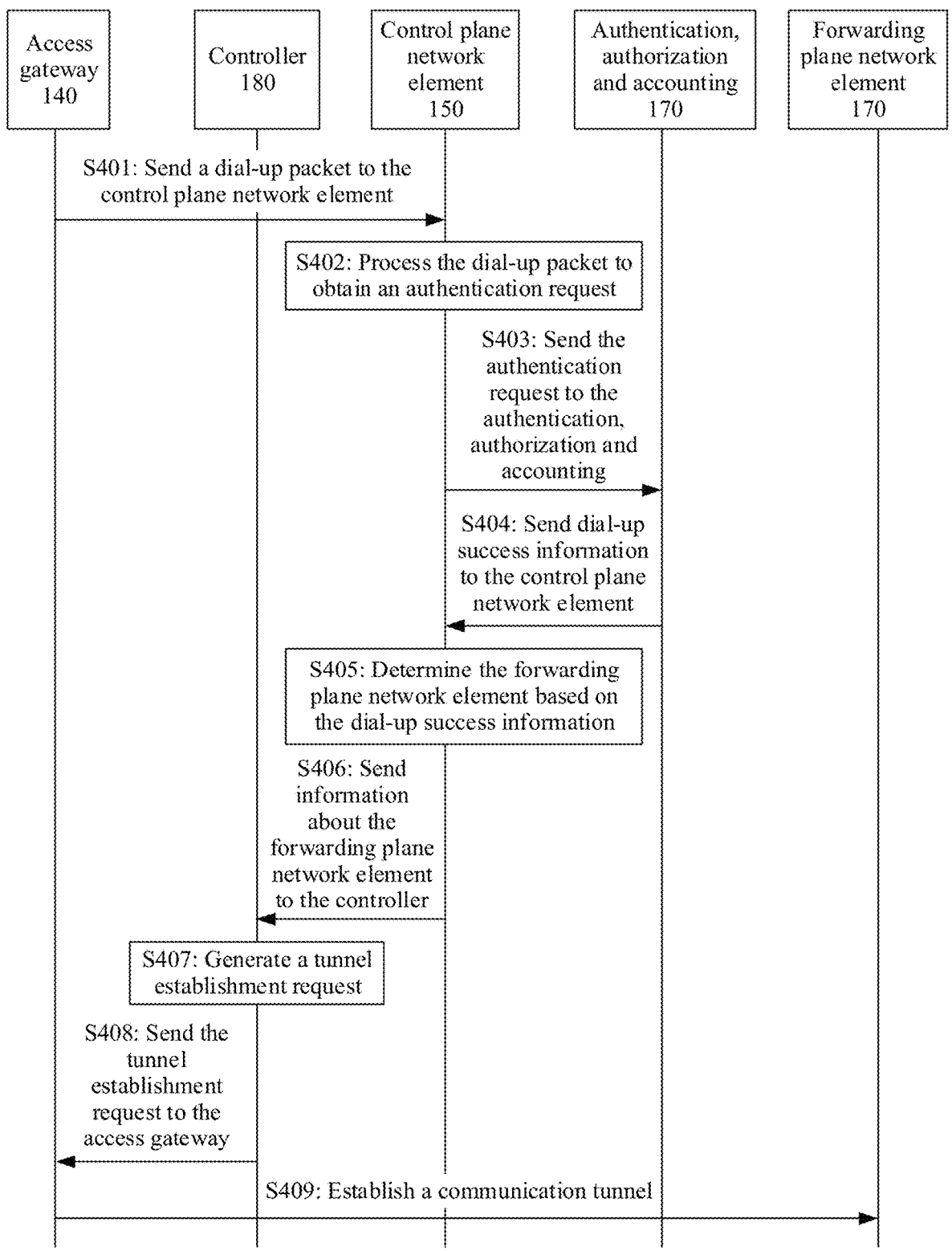
FIG. 5 is a schematic flowchart of a dial-up packet processing method according to this application.

A dial-up packet processing method provided in this application is described below based on the dial-up packet system shown in FIG. 5. As shown in FIG. 5, the dial-up packet processing method provided in an embodiment of this application may include the following steps.

S401: The AGW 140 sends a dial-up packet to the control plane network element 150. The dial-up packet is a dial-up packet sent by user equipment to the access gateway, the dial-up packet is a dial-up packet sent by the user equipment to the control plane network element through the access gateway, and the dial-up packet includes an IP address of the user equipment. It can be learned from the foregoing content that the dial-up packet may be a dial-up packet sent by the switch or the OTL 130 to the AGW 140 after the user equipment 110 sends the dial-up packet to the switch or the OTL 130 through the AP or the router 120. Specifically, the AGW 140 may interact with the control plane network element 150 through the service interface in the embodiment in FIG. 4.

S402: The control plane network element 150 sends an authentication request to an external server. The authentication request is generated by the control plane network element based on the dial-up packet, the external server is configured to authenticate whether the user equipment successfully performs dial-up, and the external server may be the AAA 170 in the foregoing content. For a process of implementing step S402, refer to the detailed descriptions of step S230 in the embodiment in FIG. 3. In addition, the control plane network element 150 may interact with the AAA 170 through a remote connection by using a RADIUS interface. For details, refer to the embodiment in FIG. 4. Details are not described herein again.

S403: The external server (AAA 170) processes the authentication request, and obtains dial-up success information when the dial-up succeeds. The dial-up success information includes SLA information corresponding to the IP address. For an implementation process of step S403, refer to the detailed descriptions of step S240 in the embodiment in FIG. 3. Details are not described herein again.

S404: The AAA 160 returns the dial-up success information to the control plane network element 150. For an implementation process of step S404, refer to the detailed descriptions of step S250 in the embodiment in FIG. 3. Details are not described herein again.

S405: The control plane network element 150 determines, based on the dial-up success information, the target forwarding plane network element corresponding to the IP address. The dial-up success information includes service level agreement SLA information corresponding to the IP address, and that the control plane network element 150 determines the forwarding plane network element 160 based on the dial-up success information includes: The control plane network element 150 determines the forwarding plane network element 160 based on the SLA information. For an implementation process of step S405, refer to the detailed descriptions of step S260 in the embodiment in FIG. 3. Details are not described herein again.

S406: The control plane network element 150 sends information about the forwarding plane network element to the controller 180. Specifically, the information about the forwarding plane network element includes interface information of the forwarding plane network element and interface information of the access gateway. In a specific implementation, the control plane network element may interact with the SDN controller through the Netconf interface in the embodiment in FIG. 4.

S407: The controller 180 generates a tunnel establishment request based on the interface information of the target forwarding plane network element. The tunnel establishment request is used to establish a communication tunnel between the AGW 140 and the target forwarding plane network element.

In a specific implementation, the communication tunnel may be a tunnel of a second-layer network in an open systems interconnection (OSI) model, for example, a virtual extensible local area network (VXLAN) tunnel, a virtual leased line (VLL) tunnel, and an Ethernet virtual private network (EVPN) tunnel, and may further include a tunnel supported by a second-layer network in another OSI model. This is not specifically limited in this application.

S408: The controller 180 sends the tunnel establishment request to the AGW 140. The controller 180 may interact with the AGW 140 through the Netconf interface in the embodiment in FIG. 4.

S409: The AGW 140 establishes the communication tunnel to the target forwarding plane network element based on the tunnel establishment request. The communication tunnel is in a correspondence with the IP address. After the communication tunnel is established, one user equipment can exclusively use one virtual local area network (VLAN), so that user experience is improved. Specifically, the AGW 140 may establish communication tunnels between a plurality of forwarding plane network elements and the AGW in advance, and then map port information of the user equipment to the communication tunnel to the target forwarding plane network element.

The following uses a VXLAN tunnel as an example to describe a process in which the AGW establishes the communication tunnel to the target forwarding plane network element based on the tunnel establishment request. The process may be implemented in two manners. A first implementation is as follows: The AGW may establish a VXLAN tunnel based on the interface information of the target forwarding plane network element by manually configuring a tunnel interface and specifying a source IP address and a destination IP address of the tunnel as IP addresses of the local AGW and the forwarding plane network element respectively, then map the port information of the user equipment to the specified VXLAN tunnel, so that after receiving a data packet sent by a user, the AGW directly determines the previously mapped specified VXLAN tunnel based on the port information of the user equipment, and sends the data packet to the target forwarding plane network element through the VXLAN tunnel. A second implementation is as follows: The AGW may alternatively discover a remote VXLAN tunnel end point (VTEP) in advance by using the enhance neighbor discovery protocol (ENDP), and automatically establish a plurality of VXLAN tunnels between the local AGW and the remote VTEP. After receiving the tunnel establishment request, the AGW obtains a VXLAN tunnel to the target forwarding plane network element from the plurality of VXLAN tunnels, and then map the port information of the user equipment to the VXLAN tunnel, so that after receiving a data packet sent by a user, the AGW directly determines the previously mapped specified tunnel based on the port information of the user equipment, and send the data packet to the target forwarding plane network element through the tunnel.

In a specific embodiment, after that the control plane network element receives the dial-up success information sent by the external server, the method further includes: The control plane network element generates session information based on the dial-up success information, where the session information corresponds to the IP address; and the control plane network element sends the session information to the forwarding plane network element, so that the forwarding plane network element publishes routing information to the outside based on the session information, where a destination address of the routing information is the IP address. This step is the same as step S270 and step S280 in the foregoing content. Therefore, details are not described herein again.

Specifically, the control plane network element 150 may deliver the session information to the forwarding plane network element 160 through the control interface 151 shown in FIG. 2. After the target forwarding plane network element publishes the routing information, if the target forwarding plane network element again receives a data packet sent by the user equipment, the target forwarding plane network element may determine a next-hop IP address of the data packet based on a destination IP address of the data packet and the routing information, to forward the data packet of the user equipment. It should be noted that this step and step S406 to step S409 may be performed simultaneously, or may be performed sequentially. In other words, the control plane network element may send the session information to the forwarding plane network element while sending the interface information of the target forwarding plane network element to the controller. This is not specifically limited in this application.

In a specific embodiment, the method further includes: The access gateway receives a data packet, where a source IP address of the data packet is the IP address; the access gateway determines, based on the IP address, the communication tunnel corresponding to the IP address; and the access gateway transmits the data packet to the forwarding plane network element through the communication tunnel. It may be understood that, after the user equipment sends the dial-up packet for the first time, after step S401 to step S409, the AGW has established the communication tunnel to the target forwarding plane network element, and the tunnel is in the correspondence with the IP address of the user equipment. Therefore, when the user equipment sends a data packet to the AGW again, the AGW may directly transmit the data packet to the target forwarding plane network element through the tunnel, and the target forwarding plane network element may forward the data packet based on the previously stored routing information.

In a specific embodiment, when the IP address has been in a correspondence with a second communication tunnel, after that the control plane network element determines the forwarding plane network element based on the dial-up success information, the method further includes: The control plane network element sends the information about the forwarding plane network element to the controller, so that the controller sends a tunnel switch request to the access gateway, where the tunnel switch request is generated by the controller based on the information about the forwarding plane network element, the tunnel switch request is used to switch a communication tunnel corresponding to the IP address from the second communication tunnel to the first communication tunnel, and the second communication tunnel is a communication tunnel between the access gateway and another forwarding plane network element. In other words, if the user equipment has sent the dial-up packet once before step S401, the AGW establishes the communication tunnel to the another target forwarding plane network element (for example, a UP 1); and when the user equipment sends the dial-up packet for the second time, an SLA level of the user changes, the control plane network element determines a UP 2 as the target forwarding plane network element of the current user equipment. In this case, in step S409, the AGW 140 may switch the communication tunnel between the AGW 140 and the UP 1 to the communication tunnel between the AGW 140 and the UP 2. That is, if the port information and VLAN information that correspond to the user equipment are previously mapped to a VxLAN channel to the UP 1, after the control plane network element determines the UP 2 as the target forwarding plane network element of the user equipment, in step S409, the AGW 140 may map the port information and the VLAN information that correspond to the user equipment to a VxLAN channel to the UP 2, so that a user data forwarding packet subsequently sent by the user equipment is sent to the UP 2 through the switched VxLAN channel for forwarding.

For example, it is assumed that after user equipment 1 sends a dial-up packet to the AGW for the first time, the AGW performs step S401 to send the dial-up packet to the control plane network element. The control plane network element performs step S402 to process the dial-up packet to obtain an authentication request, and performs step S403 to send the authentication request to the AAA for authentication. The AAA performs step S404 to generate dial-up success information, and sends the information to the control plane network element. Then, the control plane network element performs step S405 and step S406, determines, based on the dial-up success information, that a target forwarding plane network element corresponding to an SLA level of the user equipment is the UP 1, and sends interface information of the UP 1 and port information of the AGW to the controller. The controller performs steps S407 and S408 to generate a tunnel establishment request, and delivers the tunnel establishment request to the AGW. Finally, the AGW performs step S409 to map port information of the user equipment to a tunnel 1 to the UP 1, to complete a process of processing the dial-up packet for the first time. Then, the user equipment may send a data packet to the AGW. The AGW sends the data packet to the UP 1 through the communication tunnel 1 corresponding to a port address of the user equipment, so that the UP 1 forwards the data packet.

It is assumed that the SLA protocol is modified after the user equipment uses a network for a period of time. In this case, after the user equipment sends the dial-up packet to the AGW for the second time, the AGW performs step S401 to send the dial-up packet to the control plane network element. The control plane network element performs step S402 to process the dial-up packet to obtain an authentication request, and performs step S403 to send the authentication request to the AAA for authentication. The AAA performs step S404 to generate dial-up success information, and sends the information to the control plane network element. Then, the control plane network element performs step S405 and step S406, determines, based on the dial-up success information, that a target forwarding plane network element corresponding to an SLA level of the user equipment is the UP 2, and sends interface information of the UP 2 and the port information of the AGW to the controller. The controller performs steps S407 and S408 to generate a tunnel switch request, and delivers the tunnel switch request to the AGW. Finally, the AGW performs step S409 to map, to a tunnel 2 to the UP 2, the port information of the user equipment from the tunnel 1 to the UP 1, to complete a process of processing the dial-up packet for the second time. Then, the user equipment may send a data packet to the AGW. The AGW sends the data packet to the UP 2 through the communication tunnel 2 corresponding to the port address of the user equipment, so that the UP 2 forwards the data packet.

It may be understood that, when the user equipment sends a dial-up packet for the first time, the AGW sends the dial-up packet to the control plane network element, because the SLA level of the user equipment is low, the control plane network element determines to use the UP 1 to forward a data packet of the user equipment. Assuming that a user is not satisfied with a current network service, after the SLA level is changed to a high level, the user equipment sends the dial-up packet for the second time. After receiving the dial-up packet for the second time, the AGW also sends the packet to the control plane network element, the control plane network element determines to use the UP 2 to forward a data packet of the user equipment. The forwarding plane network element does not need to participate in the two dial-up packet processing processes, so that processing pressure of the forwarding plane network element is greatly reduced in comparison with the dial-up packet processing method in the embodiment in FIG. 3.

In conclusion, according to the dial-up packet processing method provided in this embodiment of this application, after receiving the dial-up packet, the access gateway sends the dial-up packet to the control plane network element for processing. After interacting with the external server to obtain the dial-up success information, the control plane network element may determine the target forwarding plane network element based on the SLA information in the dial-up success information, and notifies the controller of the interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that the processing pressure of the forwarding plane network element can be reduced. The forwarding plane network element only needs to process forwarding of the data packet, and does not need to participate in processing of the dial-up packet. This implements decoupling of a forwarding plane and a control plane in real sense, and facilitates deployment and operations and maintenance of a carrier network.

Figure 6A:
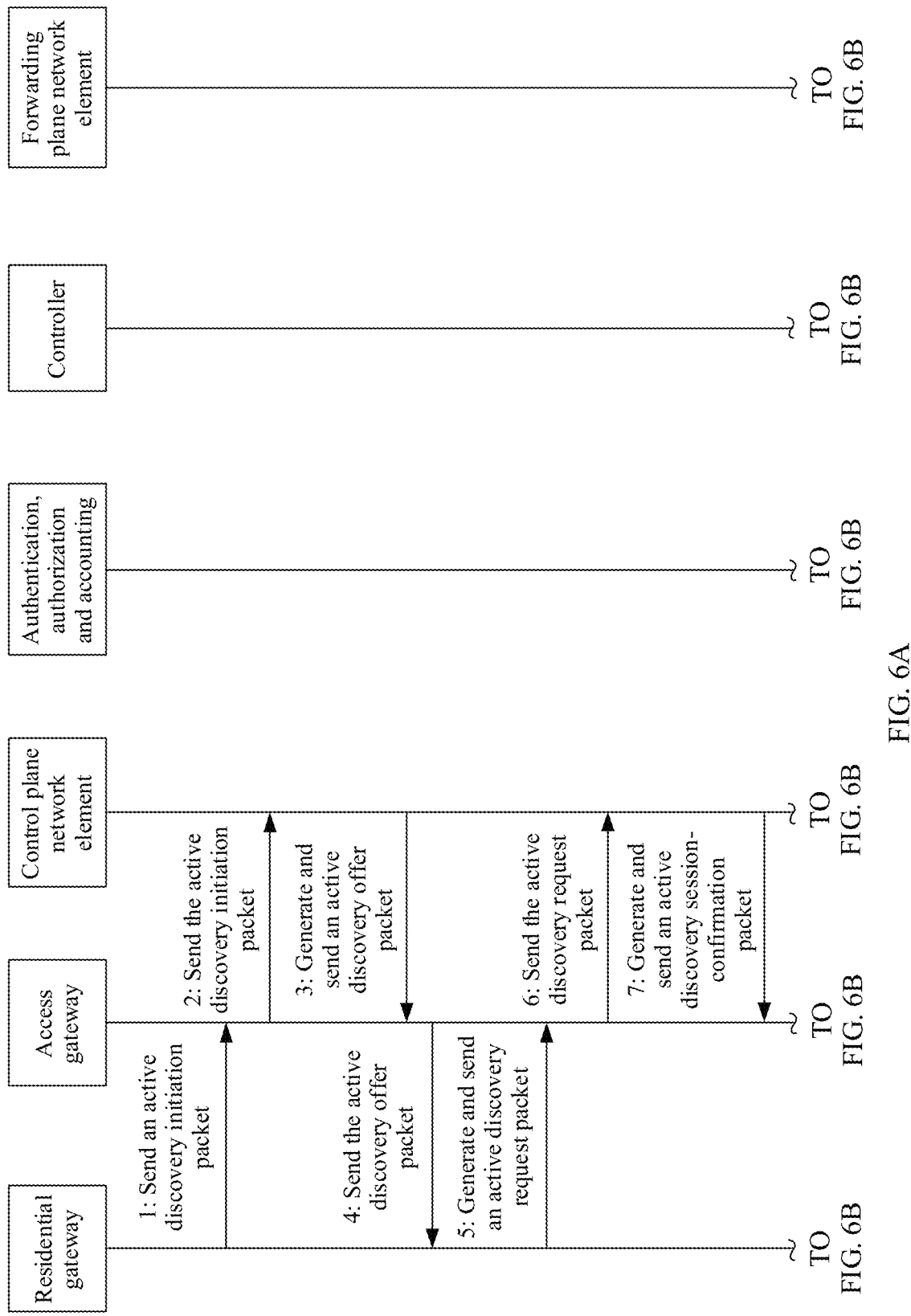
FIG. 6A, FIG. 6B, and FIG. 6C are a schematic flowchart of steps of a dial-up packet processing method in an application scenario according to this application.
Figure 6B:
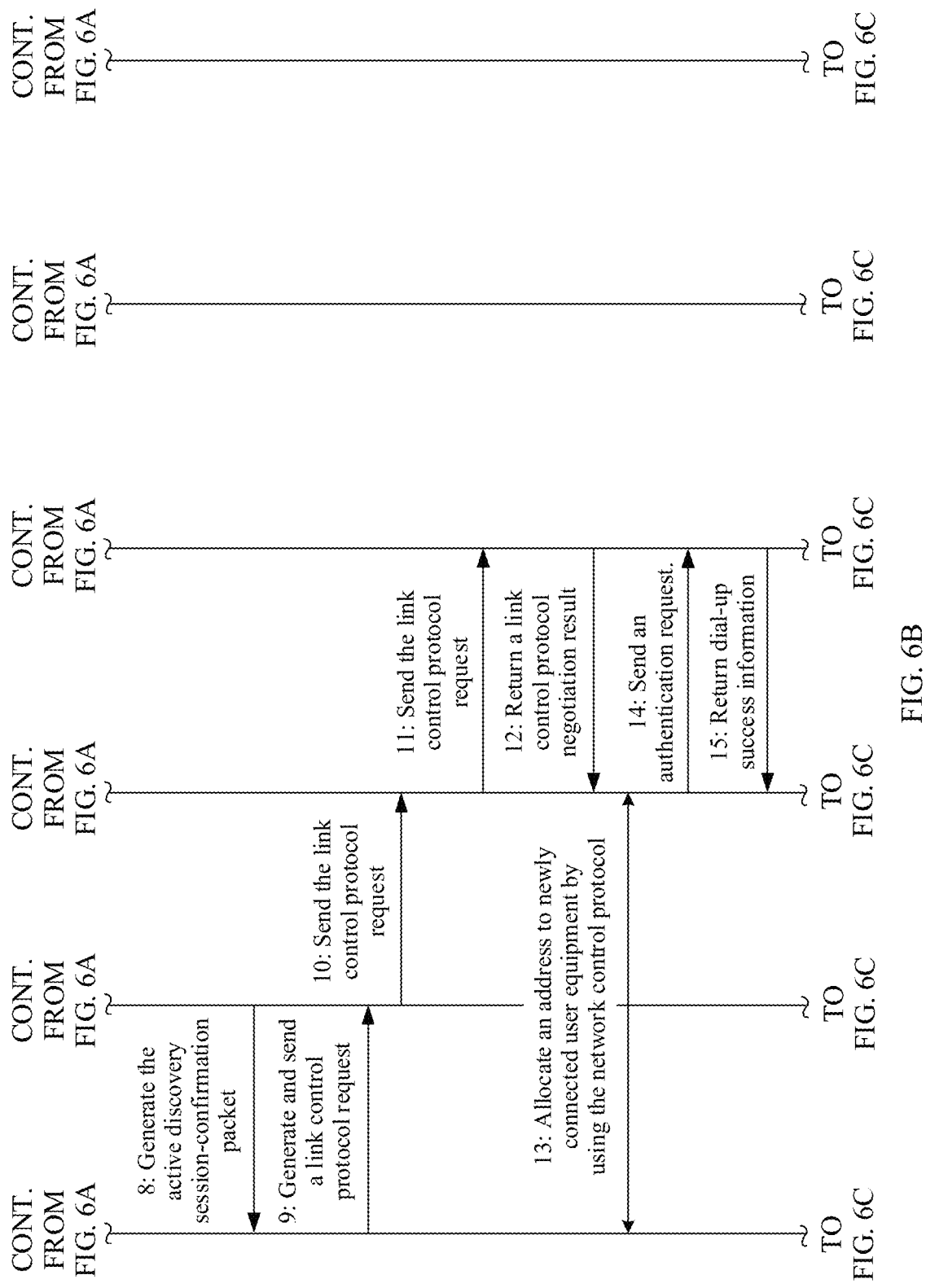
Figure 6C:
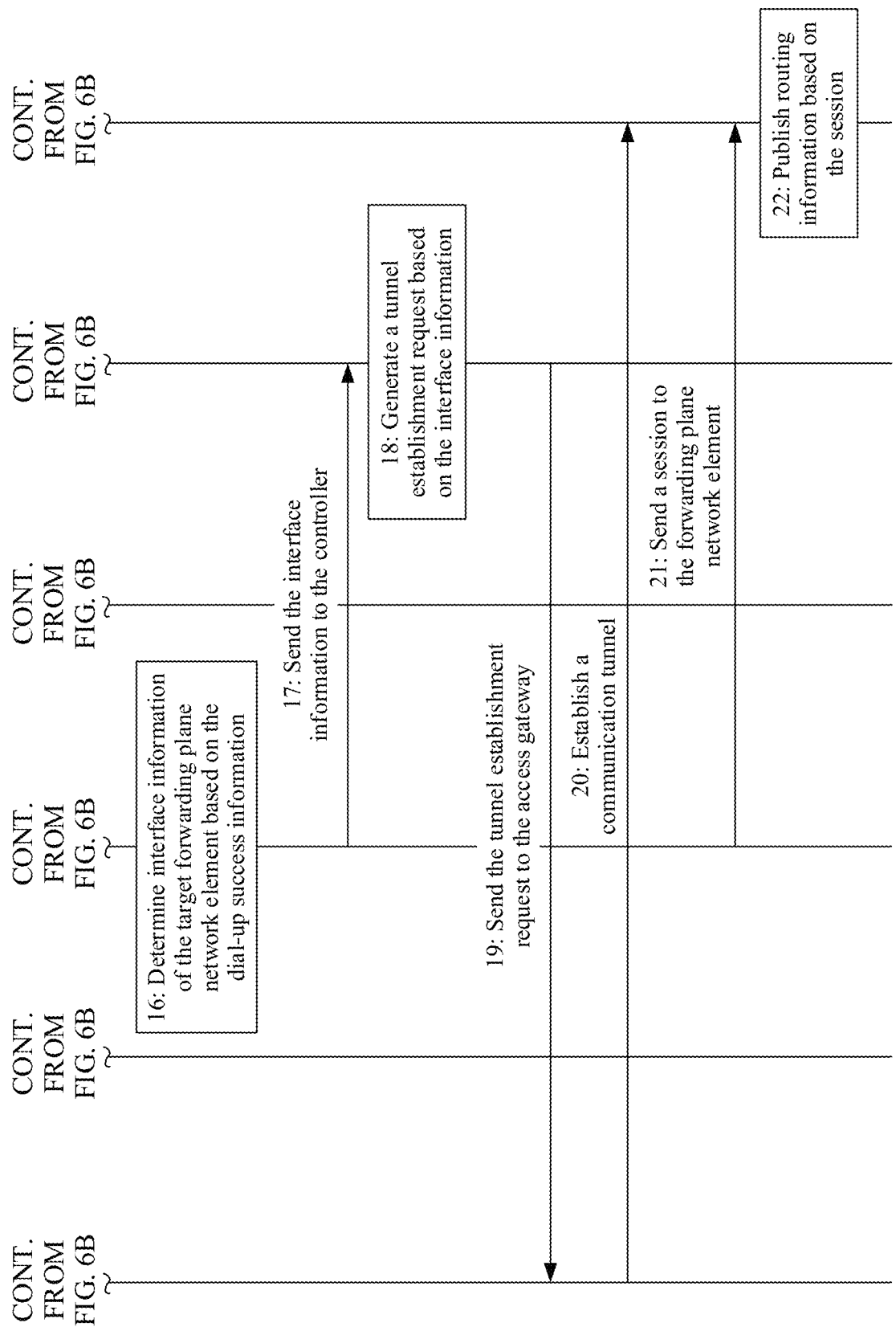

The following describes a specific implementation of the dial-up packet processing method in this application by using an application scenario of point-to-point protocol over Ethernet (PPPoE) dial-up access as an example. It may be understood that a discovery phase of the PPPoE protocol is usually divided into four steps. A plurality of different dial-up packets are transmitted to an AGW, and the AGW only needs to sequentially send the plurality of packets to a control plane network element for authentication without participation of a forwarding plane network element. In comparison with the method in the embodiment in FIG. 3 in which the forwarding plane network element needs to participate in the dial-up packet processing, processing pressure of the forwarding plane network element can be greatly reduced by using the dial-up packet processing method provided in this application. As shown in FIG. 6A, FIG. 6B, and FIG. 6C, specific steps of performing PPPoE dial-up access by using the dial-up packet processing method provided in this embodiment of this application may be as follows:

1: The AGW receives an active discovery initiation (PPPoE Active Discovery Initiation, PADI) packet sent by a residential gateway (RGW). The PADI packet includes access information of user equipment, and the PADI packet is used to obtain all connectable access devices, for example, the control plane network element. The RGW is connected to the user equipment. Using an example in which the RGW is connected to an OLT, an information format of port information of the user equipment in the PADI packet may be as follows: OLTID/ANI_frame/ANI_slot/ANI_subslot/ANI_port/ONU_ID, where OLTID represents ID information of the OLT accessed by the user equipment; ANI_frame/ANI_slot/ANI_subslot/ANI_port respectively represents a frame number of an access node of the user equipment, a slot number of the access node, a subslot number of the access node, and a port number of the access node. For some devices that do not have the concepts of rack, frame, and subslot, corresponding positions can be filled with 0; and ONU_ID represents ID information of an optical network unit (ONU) accessed by the user equipment. It should be understood that the foregoing format is merely used for description, and does not constitute a specific limitation.

2: The AGW sends the PADI packet to the control plane network element.

3: The control plane network element generates an active discovery offer (PPPoE Active Discovery Offer, PADO) packet based on the PADI packet, and returns the PADO packet to the AGW. The PADO packet is a response to the PADI packet, and indicates that the control plane network element agrees to connect to the user equipment. The PADO packet includes at least a server name type label and a MAC address of a server, and the server name type label indicates a type of a service that can be provided by the control plane network element for the user equipment. The PADO packet still carries the port information of the user equipment. For an information format, refer to the example in step 1. Details are not described herein again.

4: The AGW returns the PADO packet to the RGW.

5: The RGW generates an active discovery request (PPPoE Active Discovery Request, PADR) packet based on the PADO packet, and sends the PADR packet to the AGW. Specifically, the user equipment may select an appropriate access device from a plurality of received PADO packets based on server name type labels in the PADO packets. In this example, the user equipment selects the control plane network element as the access device. The PADR packet includes at least one server name type label, to determine a service type of the requested access device. The PADR packet still carries the port information of the user equipment. For an information format, refer to the example in step 1. Details are not described herein again.

6: The AGW sends the PADR packet to the control plane network element.

7: The control plane network element generates an active discovery session-confirmation (PPPoE Active Discovery Session information-Confirmation, PADS) packet based on the PADR packet, and returns the PADS packet to the AGW. Specifically, after receiving the PADR packet, the control plane network element is ready to enter a session phase. In this case, the control plane network element allocates a unique session ID to a subsequent session, and generates the PADS packet including the session ID, so that after receiving the PADS packet, the user equipment generates session information based on the session ID in the PADS packet. Various types of information in the session phase are stored in the session information.

8: The AGW sends the PADS packet to the RGW.

9: The RGW generates a link control protocol (LCP) request based on the PADS packet, and sends the LCP request to the AGW. The LCP request is used to negotiate, between the user equipment and the control plane network element, whether to perform authentication and an authentication manner to be used.

10: The AGW sends the LCP request to the control plane network element.

11: The control plane network element sends the LCP request to an AAA for authentication.

12: The AAA returns an LCP negotiation result, which may specifically include whether to perform authentication and an authentication manner to be used.

13: The control plane network element negotiates an IP address of the user equipment and a DNS server address with the RGW by using the network control protocol (Network Control Protocol, NCP).

14: The control plane network element sends an authentication request to the AAA, to confirm an account name, a password, and SLA information of the user equipment. For an implementation process of step 14, refer to the detailed descriptions of step S402 in the embodiment in FIG. 5. Details are not described herein again.

15: The AAA returns dial-up success information. The dial-up success information includes the SLA information of the user equipment. For an implementation process of step 15, refer to the detailed descriptions of step S403 and step S404 in the embodiment in FIG. 5. Details are not described herein again.

16: The control plane network element determines, based on the SLA information of the user equipment, the target forwarding plane network element corresponding to the IP address of the user equipment, and generates session information corresponding to the IP address of the user equipment. For an implementation process of step 16, refer to the detailed descriptions of step S260 in the embodiment in FIG. 3 and step S405 in the embodiment in FIG. 5. Details are not described herein again.

17: The control plane network element sends information about the target forwarding plane network element to a controller. In a specific implementation, the control plane network element may interact with the SDN controller through a Netconf interface, and the information about the forwarding plane network element may include interface information of the AGW and interface information of the forwarding plane network element, and may further include the port information of the user equipment. For example, a format of the information about the forwarding plane network element may be as follows: AGW_ID/ANI_slot/ANI_subslot/ANI_port/VLAN_ID/QINQ_ID, NAS_UpIdentifier/NAS_slot/NAS_subslot/NAS_port: SVLAN. CVLAN. AGW_ID/ANI_slot/ANI_subslot/ANI_port/VLAN_ID/QINQ_ID is access information of the user equipment and ID information of the AGW, and NAS_UpIdentifier/NAS_slot/NAS_subslot/NAS_port: SVLAN. CVLAN indicates the interface information of the forwarding plane network element, where NAS_UpIdentifier indicates a name of the forwarding plane network element, which is followed by slot, subslot, port, and VLAN information of the forwarding plane network element. For an implementation process of step 17, further refer to the detailed descriptions of step S406 in the embodiment in FIG. 5. Details are not described herein again.

18: The controller generates a tunnel establishment request based on the interface information of the target forwarding plane network element. The tunnel establishment request is used to establish a communication tunnel between the AGW and the target forwarding plane network element. For an implementation process of step 18, refer to the detailed descriptions of step S407 in the embodiment in FIG. 5. The tunnel establishment request may include the interface information of the AGW, the interface information of the target forwarding plane network element, and the access information of the user equipment that are described in step 17. Details are not described herein again.

19: The controller sends the tunnel establishment request to an AGW. In a specific implementation, the controller may interact with the AGW through the Netconf interface. The AGW may send, based on the interface information of the AGW in the information about the forwarding plane network element, the tunnel establishment request to the AGW corresponding to the interface information. For an implementation process of step 19, refer to the detailed descriptions of step S408 in the embodiment in FIG. 5. Details are not described herein again.

20: The AGW establishes the communication tunnel to the target forwarding plane network element based on the tunnel establishment request. Specifically, the AGW may determine, based on the information about the forwarding plane network element in the tunnel establishment request, the tunnel to the target forwarding plane network element, and map the port information of the user equipment to the tunnel based on the port information of the user equipment in the tunnel establishment request. For an implementation process of step 20, refer to the detailed descriptions of step S409 in the embodiment in FIG. 5. Details are not described herein again.

21: The control plane network element sends the session information to the target forwarding plane network element. Specifically, the control plane network element may deliver the session information to the forwarding plane network element through the control interface 151 shown in FIG. 2.

22: The target forwarding plane network element publishes routing information based on the session information, where a destination address of the routing information is the IP address corresponding to the user equipment 1, so that after again receiving a data packet sent by the user equipment 1, the target forwarding plane network element may determine a next-hop IP address of the data packet based on a destination IP address of the data packet and the routing information, to forward the data packet of the user equipment 1.

It may be understood that, in the foregoing PPPoE dial-up process, a plurality of packets (for example, the PADI packet, the PADO packet, and the PADS packet) are transmitted between the control plane network element and the AGW. It can be learned from FIG. 6A, FIG. 6B, and FIG. 6C that, in the foregoing process, the AGW interacts with the control plane network element for six times, if the dial-up packet processing method provided in this application is not used, but the method in the embodiment in FIG. 3 is used, each time the AGW sends a packet to the control plane network element or each time the control plane network element sends a packet to the AGW, the packet needs to be forwarded through the forwarding plane network element. Consequently, forwarding pressure of the forwarding plane network element is high. However, according to the method provided in this application, the control plane network element and the AGW can directly communicate with each other. This greatly reduces the processing pressure of the forwarding plane network element, so that the forwarding plane network element only needs to forward the data packet, and does not need to participate in processing of the dial-up packet. This implements decoupling of a forwarding plane and a control plane in real sense, and facilitates deployment and operations and maintenance of a carrier network.

The methods in embodiments of this application are described in detail above. For ease of better implementing the solutions in embodiments of this application, correspondingly, related devices used to cooperate in implementing the solutions are further provided below.

Figure 7:
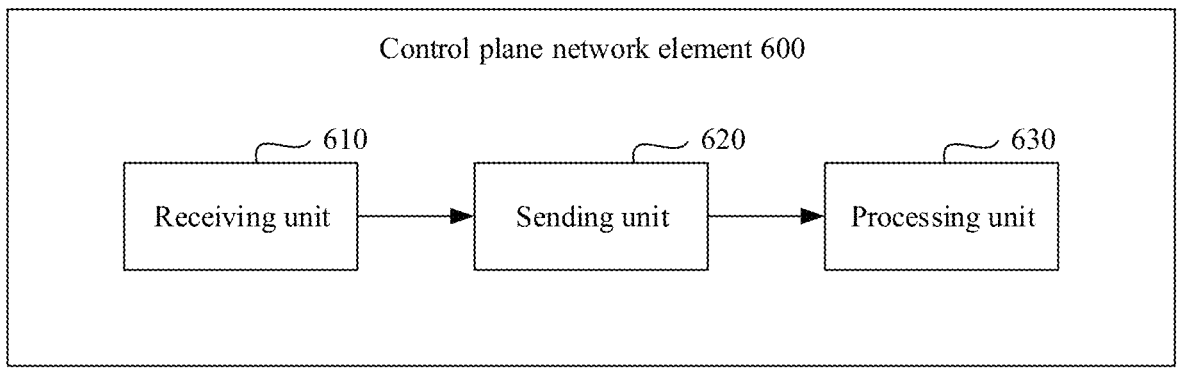
FIG. 7 is a schematic diagram of a structure of a control plane network element according to this application.

FIG. 7 is a schematic diagram of a structure of a control plane network element 600 according to an embodiment of this application. The control plane network element 600 may be used in the dial-up packet processing system shown in FIG. 1. The system includes a controller, an access gateway, a forwarding plane network element, and a control plane network element that are connected to each other. For details, refer to the descriptions in the embodiments shown in FIG. 4 to FIG. 6C. The control plane network element 600 may be a vBNG-CP device. For example, the control plane network element 600 may be a virtual session control unit (vSCU). In a specific implementation, a vBNG-UP or a vSCU may be used as a VNF in an NFV scenario and runs on an X86 server, namely, an X86 server virtualization network element, which may be a virtual machine running on the X86 server. As shown in FIG. 7, the control plane network element 600 may include a receiving unit 610, a sending unit 620, and a processing unit 630.

The receiving unit 610 is configured to receive a dial-up packet from the access gateway, where the dial-up packet is a dial-up packet sent by user equipment to the access gateway. For a specific implementation, refer to the detailed descriptions of step S401 in the embodiment shown in FIG. 5. Details are not described herein again.

The sending unit 620 is configured to send an authentication request to an external server, where the authentication request is generated by the control plane network element based on the dial-up packet. For a specific implementation, refer to the detailed descriptions of step S402 in the embodiment shown in FIG. 5 and the detailed descriptions of step S220 in the embodiment shown in FIG. 3. Details are not described herein again.

The receiving unit 610 is further configured to receive dial-up success information sent by the external server. For a specific implementation, refer to the detailed descriptions of step S404 in the embodiment shown in FIG. 5 and the detailed descriptions of step S250 in the embodiment shown in FIG. 3. Details are not described herein again.

The processing unit 630 is configured to determine the forwarding plane network element based on the dial-up success information, so that the user equipment performs network communication through the forwarding plane network element. For a specific implementation, refer to the detailed descriptions of step 405 in the embodiment shown in FIG. 5, the detailed descriptions of step 16 in the embodiment shown in FIG. 6A, FIG. 6B, and FIG. 6C, and the detailed descriptions of step S260 in the embodiment shown in FIG. 3. Details are not described herein again.

In an embodiment, the dial-up packet includes an internet protocol IP address of the user equipment, and the sending unit 620 is further configured to: after the processing unit determines the forwarding plane network element based on the dial-up success information, send information about the forwarding plane network element to the controller, so that the controller sends a tunnel establishment request to the access gateway, where the tunnel establishment request is generated by the controller based on the information about the forwarding plane network element, the tunnel establishment request is used to establish a first communication tunnel between the access gateway and the forwarding plane network element, and the first communication tunnel is in a correspondence with the IP address. For a specific implementation, refer to the detailed descriptions of step S406 to step S409 in the embodiment shown in FIG. 5 and the detailed descriptions of step 17 to step 22 in the embodiment shown in FIG. 6A, FIG. 6B, and FIG. 6C. Details are not described herein again.

In an embodiment, the information about the forwarding plane network element includes interface information of the forwarding plane network element and interface information of the access gateway.

In an embodiment, when the IP address has been in a correspondence with a second communication tunnel, the sending unit 620 is further configured to: after the processing unit determines the forwarding plane network element based on the dial-up success information, send the information about the forwarding plane network element to the controller, so that the controller sends a tunnel switch request to the access gateway, where the tunnel switch request is generated by the controller based on the information about the forwarding plane network element, the tunnel switch request is used to switch a communication tunnel corresponding to the IP address from the second communication tunnel to the first communication tunnel, and the second communication tunnel is a communication tunnel between the access gateway and another forwarding plane network element.

In an embodiment, the dial-up success information includes service level agreement SLA information corresponding to the IP address, and the processing unit is configured to determine the forwarding plane network element based on the SLA information.

In an embodiment, the processing unit 630 is further configured to: after the receiving unit receives the dial-up success information sent by the external server, generate, by the control plane network element, session information based on the dial-up success information, where the session information corresponds to the IP address; and the sending unit 620 is further configured to send the session information to the forwarding plane network element, so that the forwarding plane network element publishes routing information to the outside based on the session information, where a destination address of the routing information is the IP address. For a specific implementation, refer to the detailed descriptions of step S270 and step S280 in the embodiment shown in FIG. 3 and the detailed descriptions of step 21 and step 22 in the embodiment shown in FIG. 6A, FIG. 6B, and FIG. 6C. Details are not described herein again.

It should be understood that FIG. 7 is merely a possible implementation of the control plane network element. In an actual application, the control plane network element 600 may further include more or fewer units, modules, or subsystems. This is not limited in this application.

According to the control plane network element provided in this application, after receiving the dial-up packet, the access gateway sends the dial-up packet to the control plane network element for processing. After interacting with the external server to obtain the dial-up success information, the control plane network element may determine the target forwarding plane network element based on the SLA information in the dial-up success information, and notifies the controller of the interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of a data packet, and does not need to participate in processing of the dial-up packet. This implements decoupling of a forwarding plane and a control plane in real sense, and facilitates deployment and operations and maintenance of a carrier network.

Figure 8:
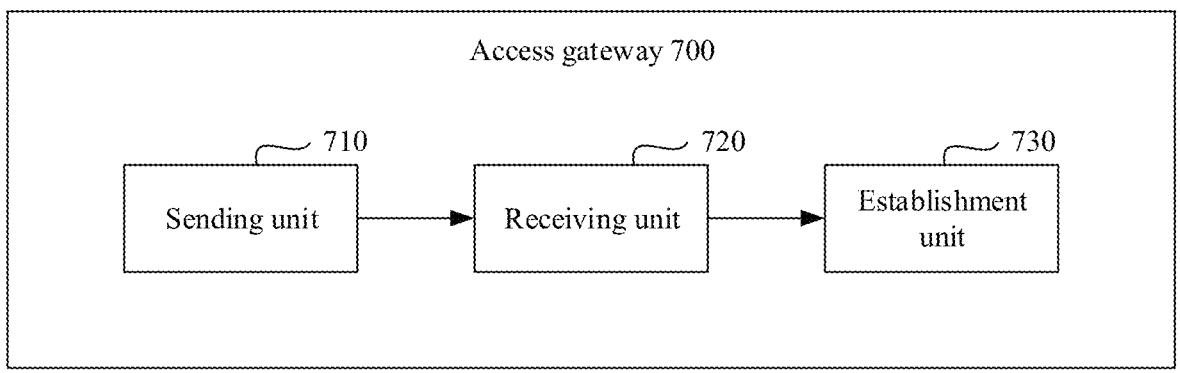
FIG. 8 is a schematic diagram of a structure of an access gateway according to this application.

FIG. 8 is a schematic diagram of a structure of an access gateway 700 according to this application. The access gateway 700 may be used in the dial-up packet processing system shown in FIG. 1. The system includes a controller, an access gateway, a forwarding plane network element, and a control plane network element that are connected to each other. As shown in FIG. 8, the access gateway 700 may include a sending unit 710, a receiving unit 720, and an establishment unit 730.

The receiving unit 720 is configured to receive a sent dial-up packet sent by user equipment, where the dial-up packet includes an internet protocol IP address of the user equipment.

The sending unit 710 is configured to send the dial-up packet to the control plane network element. For a specific implementation, refer to the detailed descriptions of step S401 in the embodiment shown in FIG. 5. Details are not described herein again.

The receiving unit 720 is further configured to receive a tunnel establishment request from the controller, where the tunnel establishment request is used to establish a communication tunnel between the access gateway and the forwarding plane network element. For a specific implementation, refer to the detailed descriptions of step S408 in the embodiment shown in FIG. 5 and the detailed descriptions of step 19 in the embodiment shown in FIG. 6A, FIG. 6B, and FIG. 6C. Details are not described herein again.

The establishment unit 730 is configured to establish a first communication tunnel to the forwarding plane network element based on the tunnel establishment request, where the first communication tunnel is in a correspondence with the IP address. For a specific implementation, refer to the detailed descriptions of step S409 in the embodiment shown in FIG. 5 and the detailed descriptions of step 20 in the embodiment shown in FIG. 6A, FIG. 6B, and FIG. 6C. Details are not described herein again.

In an embodiment, the forwarding plane network element is determined by the control plane network element based on dial-up success information returned by an external server, after the control plane network element generates an authentication request based on the dial-up packet and sends the authentication request to the external server; and the tunnel establishment request is generated by the controller based on information that is about the forwarding plane network element and that is sent by the control plane network element. For a specific implementation, refer to the detailed descriptions of step S405 in the embodiment shown in FIG. 5, the detailed descriptions of step 16 in the embodiment shown in FIG. 6A, FIG. 6B, and FIG. 6C, and the detailed descriptions of step S260 in the embodiment shown in FIG. 3. Details are not described herein again.

In an embodiment, the information about the forwarding plane network element includes interface information of the forwarding plane network element and interface information of the access gateway.

In an embodiment, the dial-up success information includes service level agreement SLA information corresponding to the IP address, and the forwarding plane network element is determined based on the SLA information in the dial-up success information returned by the external server, after the control plane network element generates an authentication request based on the dial-up packet and sends the authentication request to the external server.

In an embodiment, when the IP address has been in a correspondence with a second communication tunnel, the receiving unit 720 is further configured to receive a tunnel switch request from the controller, where the tunnel switch request is generated by the controller based on the information about the forwarding plane network element; and the establishment unit 730 is further configured to switch a communication tunnel corresponding to the IP address from the second communication tunnel to the first communication tunnel, where the second communication tunnel is a communication tunnel between the access gateway and another forwarding plane network element.

In an embodiment, the receiving unit 720 is further configured to receive a data packet, where a source IP address of the data packet is the IP address; the sending unit 710 is further configured to determine, based on the IP address, the first communication tunnel corresponding to the IP address; and the sending unit 710 is further configured to transmit the data packet to the forwarding plane network element through the first communication tunnel.

It should be understood that FIG. 8 is merely a possible implementation of the access gateway 700. In an actual application, the access gateway 700 may further include more or fewer units, modules, or subsystems. This is not limited in this application.

After receiving the dial-up packet, the access gateway provided in this application sends the dial-up packet to the control plane network element for processing. After interacting with the external server to obtain the dial-up success information, the control plane network element may determine the target forwarding plane network element based on the SLA information in the dial-up success information, and notifies the controller of interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of the data packet, and does not need to participate in processing of the dial-up packet. This implements decoupling of a forwarding plane and a control plane in real sense, and facilitates deployment and operations and maintenance of a carrier network.

Figure 9:
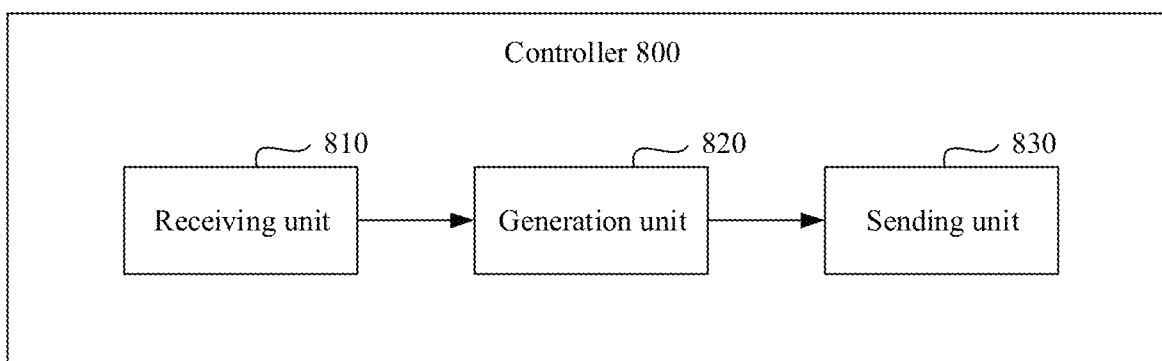
FIG. 9 is a schematic diagram of a structure of a controller according to this application.

FIG. 9 is a schematic diagram of a structure of a controller 800 according to this application. The controller 800 may be used in the dial-up packet processing system shown in FIG. 1. The system includes a controller, an access gateway, a forwarding plane network element, and a control plane network element that are connected to each other. As shown in FIG. 9, the controller 800 may include a receiving unit 810, a generation unit 820, and a sending unit 830.

The receiving unit 810 is configured to receive information that is about the forwarding plane network element and that is sent by the control plane network element, where the information about the forwarding plane network element is determined by the control plane network element after the control plane network element receives a dial-up packet that is of user equipment and that is sent by the access gateway, and the dial-up packet includes an internet protocol IP address of the user equipment. For a specific implementation, refer to the detailed descriptions of step S406 in the embodiment shown in FIG. 5 and the detailed descriptions of step 17 in the embodiment shown in FIG. 6A, FIG. 6B, and FIG. 6C. Details are not described herein again.

The generation unit 820 is configured to generate a tunnel establishment request based on the information about the forwarding plane network element. The tunnel establishment request is used to establish a communication tunnel between the access gateway and the forwarding plane network element. For a specific implementation, refer to the detailed descriptions of step S407 in the embodiment shown in FIG. 5 and the detailed descriptions of step 18 in the embodiment shown in FIG. 6A, FIG. 6B, and FIG. 6C. Details are not described herein again.

The sending unit 830 is configured to send the tunnel establishment request to the access gateway, so that the access gateway establishes a first communication tunnel to the forwarding plane network element based on the tunnel establishment request, where the first communication tunnel is in a correspondence with the IP address. For a specific implementation, refer to the detailed descriptions of step S408 in the embodiment shown in FIG. 5 and the detailed descriptions of step 19 in the embodiment shown in FIG. 6A, FIG. 6B, and FIG. 6C. Details are not described herein again.

In an embodiment, the first communication tunnel is used by the access gateway to: when the access gateway receives a data packet whose source IP address is the IP address, determine, based on the IP address, the first communication tunnel corresponding to the IP address; and transmit the data packet to the forwarding plane network element through the first communication tunnel.

In an embodiment, when the IP address has been in a correspondence with a second communication tunnel, the receiving unit 810 is further configured to receive the information that is about the forwarding plane network element and that is sent by the control plane network element; the generation unit 820 is further configured to generate a tunnel switch request based on the information about the forwarding plane network element, where the tunnel switch request is used to switch a communication tunnel corresponding to the IP address from the second communication tunnel to the first communication tunnel, and the second communication tunnel is a communication tunnel between the access gateway and another forwarding plane network element; and the sending unit 830 is further configured to send the tunnel switch request to the access gateway.

In an embodiment, the information about the forwarding plane network element includes interface information of the forwarding plane network element and interface information of the access gateway.

In an embodiment, dial-up success information includes service level agreement SLA information corresponding to the IP address, and the forwarding plane network element is determined based on the SLA information in the dial-up success information returned by an external server, after the control plane network element generates an authentication request based on the dial-up packet and sends the authentication request to the external server.

It should be understood that FIG. 9 is merely a possible implementation of the controller 800. In an actual application, the controller 800 may further include more or fewer units, modules, or subsystems. This is not limited in this application.

According to the controller provided in this application, after receiving the dial-up packet, the access gateway sends the dial-up packet to the control plane network element for processing. After interacting with the external server to obtain the dial-up success information, the control plane network element may determine the target forwarding plane network element based on the SLA information in the dial-up success information, and notifies the controller of the interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of a data packet, and does not need to participate in processing of the dial-up packet. This implements decoupling of a forwarding plane and a control plane in real sense, and facilitates deployment and operations and maintenance of a carrier network.

Figure 10:
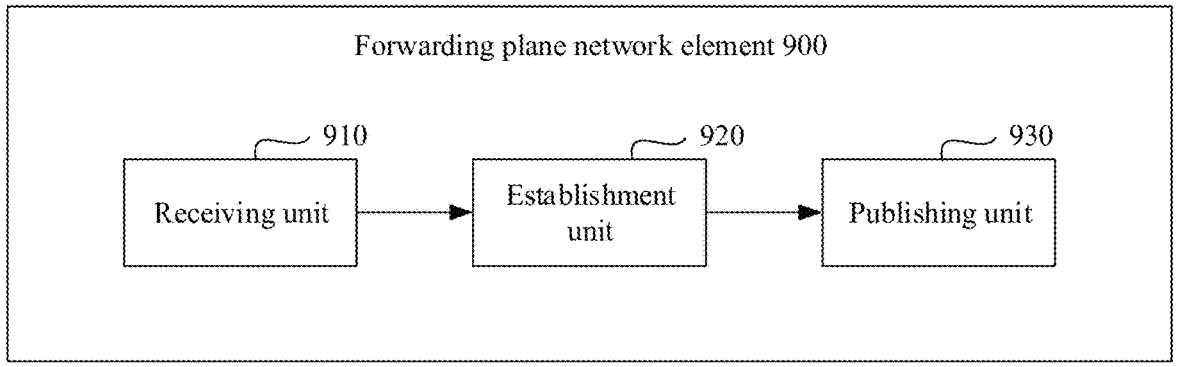
FIG. 10 is a schematic diagram of a structure of a forwarding plane network element according to this application.

FIG. 10 is a schematic diagram of a structure of a forwarding plane network element 900 according to this application. The forwarding plane network element 900 may be used in the dial-up packet processing system shown in FIG. 1. The system includes a controller, an access gateway, a forwarding plane network element, and a control plane network element that are connected to each other. The forwarding plane network element 900 may be a virtualized network element, or may be a physical device. When the forwarding plane network element 900 is the virtualized network element, the forwarding plane network element 900 may be referred to as a vUP or a vSFU for short, and may be specifically a VNF running on an X86 server. When the forwarding plane network element 900 is the physical device, the forwarding plane network element may be referred to as a pUP or a pSFU for short, and may be specifically a conventional hardware network device. As shown in FIG. 10, the forwarding plane network element 900 may include a receiving unit 910 and an establishment unit 920.

The receiving unit 910 is configured to receive a tunnel establishment request from the access gateway, where the tunnel establishment request is used to establish a communication tunnel between the access gateway and the forwarding plane network element, and the tunnel establishment request is generated by the controller based on information that is about the forwarding plane network element and that is sent by the control plane network element after the control plane network element determines the forwarding plane network element after receiving a dial-up packet sent by user equipment, where the dial-up packet includes an internet protocol IP address of the user equipment. For a specific implementation, refer to the detailed descriptions of step S409 in the embodiment shown in FIG. 5 and the detailed descriptions of step 20 in the embodiment shown in FIG. 6A, FIG. 6B, and FIG. 6C. Details are not described herein again.

The establishment unit 920 is configured to establish the communication tunnel to the access gateway, where the communication tunnel is in a correspondence with the IP address. For a specific implementation, refer to the detailed descriptions of step S409 in the embodiment shown in FIG. 5 and the detailed descriptions of step 20 in the embodiment shown in FIG. 6A, FIG. 6B, and FIG. 6C. Details are not described herein again.

In an embodiment, the information about the forwarding plane network element includes interface information of the forwarding plane network element and interface information of the access gateway.

In an embodiment, dial-up success information includes service level agreement SLA information corresponding to the IP address, and the forwarding plane network element is determined based on the SLA information in the dial-up success information returned by an external server, after the control plane network element generates an authentication request based on the dial-up packet and sends the authentication request to the external server. For a specific implementation, refer to the detailed descriptions of step S405 in the embodiment shown in FIG. 5 and the detailed descriptions of step 16 in the embodiment shown in FIG. 6A, FIG. 6B, and FIG. 6C. Details are not described herein again.

In an embodiment, the receiving unit 910 is further configured to receive a data packet from the access gateway through the communication tunnel, where a source IP address of the data packet is the IP address.

In an embodiment, the forwarding plane network element further includes a publishing unit 930, and the receiving unit 910 is further configured to receive session (session) information sent by the control plane network element, where the session information is generated by the forwarding plane network element based on the dial-up success information returned by the external server, and the session information corresponds to the IP address; and the publishing unit 930 is configured to publish routing information to the outside based on the session information, where a destination address of the routing information is the IP address. For a specific implementation, refer to the detailed descriptions of step S270 and step S280 in the embodiment shown in FIG. 3 and step 21 and step 22 in the embodiment shown in FIG. 6A, FIG. 6B, and FIG. 6C. Details are not described herein again.

It should be understood that FIG. 10 is merely a possible implementation of the forwarding plane network element 900. In an actual application, the forwarding plane network element 900 may further include more or fewer units, modules, or subsystems. This is not limited in this application.

According to the forwarding plane network element provided in this application, after receiving the dial-up packet, the access gateway sends the dial-up packet to the control plane network element for processing. After interacting with the external server to obtain the dial-up success information, the control plane network element may determine the target forwarding plane network element based on the SLA information in the dial-up success information, and notifies the controller of the interface information of the target forwarding plane network element, so that the controller can deliver the migration instruction to the access gateway, to establish the tunnel between the access gateway and the target forwarding plane network element. The forwarding plane network element does not participate in an entire dial-up packet processing process, so that processing pressure of the forwarding plane network element can be reduced. The forwarding plane network element only needs to process forwarding of the data packet, and does not need to participate in processing of the dial-up packet. This implements decoupling of a forwarding plane and a control plane in real sense, and facilitates deployment and operations and maintenance of a carrier network.

Figure 11:
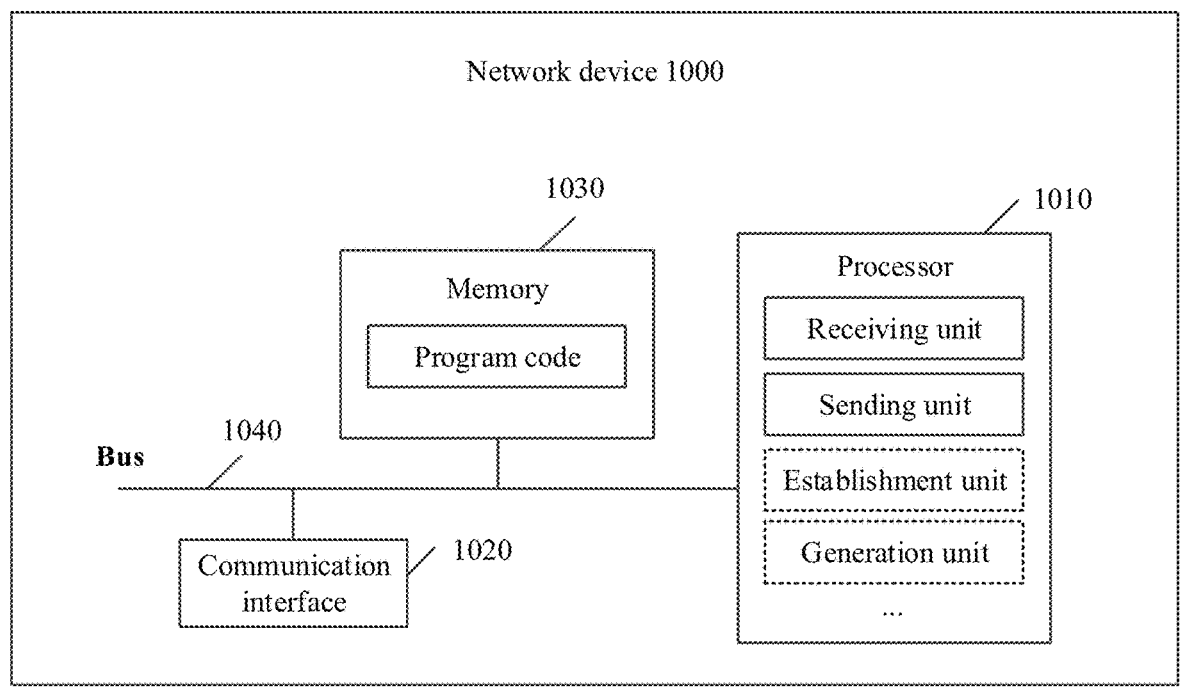
FIG. 11 is a schematic diagram of a structure of a network device according to this application.

FIG. 11 is a schematic diagram of a structure of a network device 1000 according to an embodiment of this application. The network device 1000 may be the forwarding plane network element, the controller, the access gateway, and the control plane network element in the foregoing content. As shown in FIG. 11, the network device 1000 includes a processor 1010, a communication interface 1020, a memory 1030, and a bus 1040. The processor 1010, the communication interface 1020, and the memory 1030 may be connected to each other by using an internal bus 1040, or may implement communication by using another means such as wireless transmission. In this embodiment of this application, a connection by using the bus 1040 is used as an example. The bus 1040 may be a peripheral component interconnect (Peripheral Component Interconnect, PCI) bus, an extended industry standard architecture (Extended Industry Standard Architecture, EISA) bus, or the like. The bus 1040 may be classified into an address bus, a data bus, a control bus, or the like. For ease of representation, only one bold line is used to represent the bus in FIG. 11, but this does not mean that there is only one bus or only one type of bus.

The processor 1010 may include one or more general-purpose processors, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1010 executes various types of digital storage instructions, for example, software or firmware programs stored in the memory 1030, so that the network device 1000 can provide a wide variety of services.

When the network device 1000 is the control plane network element in the foregoing content, the memory is configured to store computer instructions. The memory 1030 is configured to store program code, and the processor 1010 controls execution of the program code, to perform processing steps of the control plane network element in any embodiment in FIG. 4 to FIG. 6C. The processor 1010 is configured to execute the program code stored in the memory 1030.

The program code may include one or more software modules. The one or more software modules may be the software modules provided in the embodiment shown in FIG. 7 (where in this embodiment, the receiving unit, the sending unit, and the processing unit are software modules). For example, the receiving unit may be configured to receive a dial-up packet from the access gateway, the sending unit may be configured to send the dial-up packet to an external server, and the processing unit may determine, based on SLA information, the forwarding plane network element corresponding to the IP address. Specifically, the receiving unit, the sending unit, and the processing unit may be configured to perform S402, step S404, step S405, and optional steps of the foregoing method, and may be further configured to perform other steps described in the embodiments in FIG. 4 to FIG. 6C. Details are not described herein again.

It should be noted that this embodiment may alternatively be implemented based on a vBNG-CP device or a virtual session control unit vSCU that is implemented based on a general-purpose physical server with reference to a network functions virtualization NFV technology. The vBNG-CP device or the virtual session control unit is a virtual network device. The virtual network device may be a virtual machine VM that can implement functions of the foregoing control plane network element. The virtual machine is deployed on a hardware device (for example, a physical server such as an X86 server). The virtual machine is a complete computer system, obtained through software simulation, that runs in a completely isolated environment and has a complete hardware system function. After reading this application, a person skilled in the art may virtualize, on a general-purpose physical server with reference to the NFV technology, one or more vBNG-CP devices or virtual session control units vSCUs having the foregoing function. Details are not described herein again.

When the network device 1000 is the access gateway in the foregoing content, the memory is configured to store computer instructions. The memory 1030 is configured to store program code, and the processor 1010 controls execution of the program code, to perform processing steps of the access gateway in any embodiment in FIG. 4 to FIG. 6C. The processor 1010 is configured to execute the program code stored in the memory 1030.

The program code may include one or more software modules. The one or more software modules may be the software modules provided in the embodiment shown in FIG. 8 (where in this embodiment, the sending unit 710, the receiving unit 720, and the establishment unit 730, are software modules). For example, the receiving unit may be configured to receive a tunnel establishment request from the controller, and the establishment unit may be configured to establish a communication tunnel to the forwarding plane network element based on the tunnel establishment request. Specifically, the receiving unit and the establishment unit may be configured to perform S401, step S409, and optional steps of the foregoing method, may be further configured to perform other steps described in the embodiments in FIG. 4 to FIG. 6C. Details are not described herein again.

When the network device 1000 is the controller in the foregoing content, the memory is configured to store computer instructions. The memory 1030 is configured to store program code, and the processor 1010 controls execution of the program code, to perform processing steps of the controller in any embodiment in FIG. 4 to FIG. 6C. The processor 1010 is configured to execute the program code stored in the memory 1030.

The program code may include one or more software modules. The one or more software modules may be the software modules provided in the embodiment shown in FIG. 9 (where in the embodiment, the receiving unit, the generation unit, and the sending unit are software modules). For example, the receiving unit may be configured to receive interface information of the control plane network element from the forwarding plane network element, the generation unit may be configured to generate a tunnel establishment request based on interface information of the forwarding plane network element, and the sending unit may be configured to send the tunnel establishment request to the access gateway, so that the access gateway establishes a communication tunnel to the forwarding plane network element based on the tunnel establishment request, and the like. Specifically, the receiving unit, the generation unit, and the sending unit may be configured to perform step S406 to step S408 and optional steps of the foregoing method, and may be further configured to perform other steps described in the embodiments of FIG. 4 to FIG. 6C. Details are not described herein again.

When the network device 1000 is the forwarding plane network element in the foregoing content, the memory is configured to store computer instructions. The memory 1030 is configured to store program code, and the processor 1010 controls execution of the program code, to perform processing steps of the forwarding plane network element in any embodiment in FIG. 4 to FIG. 6C. The processor 1010 is configured to execute the program code stored in the memory 1030.

The program code may include one or more software modules. The one or more software modules may be the software modules provided in the embodiment shown in FIG. 10 (where in this embodiment, the receiving unit, the establishment unit, and the publishing unit are software modules). For example, the receiving unit is configured to receive a tunnel establishment request from the access gateway, the establishment unit is configured to establish a communication tunnel to the access gateway, and the publishing unit is configured to publish routing information based on session information, and the like. Specifically, the receiving unit, the establishment unit, and the publishing unit may be configured to perform S409 and optional steps of the foregoing method, and may be further configured to perform other steps described in the embodiments in FIG. 4 to FIG. 6C. Details are not described herein again.

It should be noted that the forwarding plane network element may be a conventional hardware network device, and is referred to as a pUP or a pSFU for short; or may be a virtual device implemented based on a general-purpose physical server with reference to a network functions virtualization NFV technology, and is referred to as a vUP or a vSFU for short. The vUP device or the vSFU is a virtual network device. The virtual network device may be a VM that can implement functions of the foregoing control plane network element. The virtual machine is deployed on a hardware device (for example, a physical server such as an X86 server). The virtual machine is a complete computer system, obtained through software simulation, that runs in a completely isolated environment and has a complete hardware system function. By reading this application, a person skilled in the art may virtualize, on a general-purpose physical server with reference to the NFV technology, one or more vSFU devices or vUP devices having the foregoing function.

The memory 1030 may include a volatile memory, for example, a random access memory (RAM); or the memory 1030 may include a non-volatile memory, for example, a read-only memory (ROM), a flash memory, a hard disk drive (HDD), or a solid-state drive (Solid-State Drive, SSD). The memory 1030 may further include a combination of the foregoing types. The memory 1030 may store program code, and may specifically include program code used to perform other steps described in the embodiments in FIG. 4 to FIG. 6C. Details are not described herein again.

The communication interface 1020 may be a wired interface (for example, an Ethernet interface), or may be an internal interface (for example, a high-speed serial computer extended bus (Peripheral Component Interconnect express, PCIe) bus interface), a wired interface (for example, an Ethernet interface), or a wireless interface (for example, a cellular network interface or a wireless local area network interface), and is configured to communicate with another device or module.

It should be noted that FIG. 11 is merely a possible implementation of embodiments of this application. In an actual application, the network device may include more or fewer components. This is not limited herein. For content that is not shown or not described in this embodiment of this application, refer to the related descriptions in the foregoing embodiments in FIG. 4 to FIG. 6C. Details are not described herein again.

It should be understood that the network device shown in FIG. 11 may alternatively be a computer cluster including a plurality of servers. This is not specifically limited in this application.

An embodiment of this application further provides a computer-readable storage medium. The computer-readable storage medium stores instructions. When the instructions are run on a processor, the method procedures shown in FIG. 4 to FIG. 6C are implemented.

An embodiment of this application further provides a computer program product. When the computer program product runs on a processor, the method procedures shown in FIG. 4 to FIG. 6C are implemented.

All or some of the foregoing embodiments may be implemented by software, hardware, firmware, or any combination thereof. When software is used to implement embodiments, all or some of the foregoing embodiments may be implemented in a form of a computer program product.

The computer program product includes one or more computer instructions. When the computer program instructions are loaded or executed on a computer, all or some of the procedures or functions according to embodiments of the present invention are generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), or a semiconductor medium. The semiconductor medium may be an SSD.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network device, configured to be applied to a control plane network element in a dial-up packet processing system comprising a controller, an access gateway, a forwarding plane network element, and the control plane network element connected to each other, and the network device comprises:
    at least one processor;
    at least one memory coupled to the at least one processor and storing programming instructions, wherein the at least one processor is configured to execute the programming instructions to cause the network device to:
    receive a dial-up packet from the access gateway, wherein the dial-up packet is a dial-up packet sent by a user equipment to the access gateway, and the dial-up packet comprises an internet protocol (IP) address of the user equipment, and the IP address corresponds with a second communication tunnel;
    send an authentication request to an external server, wherein the authentication request is generated by the control plane network element based on the dial-up packet;
    receive dial-up success information sent by the external server;
    determine the forwarding plane network element based on the dial-up success information, to enable the user equipment to perform network communication through the forwarding plane network element; and
    after the determining, by the control plane network element, the forwarding plane network element based on the dial-up success information:
        send information about the forwarding plane network element to the controller, to enable the controller to send a tunnel establishment request to the access gateway, wherein the tunnel establishment request is generated by the controller based on the information about the forwarding plane network element, the tunnel establishment request is used to establish a first communication tunnel between the access gateway and the forwarding plane network element, and the first communication tunnel will correspond with the IP address; and send the information about the forwarding plane network element to the controller, to enable the controller to send a tunnel switch request to the access gateway, wherein the tunnel switch request is generated by the controller based on the information about the forwarding plane network element, the tunnel switch request is used to switch a communication tunnel corresponding to the IP address from the second communication tunnel to the first communication tunnel, and the second communication tunnel is a communication tunnel between the access gateway and another forwarding plane network element.

2. The network device according to claim 1, wherein the information about the forwarding plane network element comprises interface information of the forwarding plane network element and interface information of the access gateway.

3. The network device according to claim 1, wherein the dial-up success information comprises service level agreement (SLA) information corresponding to the IP address, and the determining, by the control plane network element, the forwarding plane network element based on the dial-up success information comprises: determining, by the control plane network element, the forwarding plane network element based on the SLA information.

4. The network device according to claim 1, wherein after the receiving, by the control plane network element, dial-up success information sent by the external server, the network device is further caused to:

generate session information based on the dial-up success information, wherein the session information corresponds to the IP address; and sending, by the control plane network element, the session information to the forwarding plane network element, to enable the forwarding plane network element to publish routing information to a network based on the session information, wherein a destination address of the routing information is the IP address.

5. A network device, configured to be applied to a forwarding plane network element in a dial-up packet processing system comprising a controller, an access gateway, the forwarding plane network element, and a control plane network element connected to each other, and the network device comprises:

at least one processor;

at least one memory coupled to the at least one processor and storing programming instructions, wherein the at least one processor is configured to execute the programming instructions to cause the network device to:

receive a tunnel establishment request from the access gateway, wherein the tunnel establishment request is used to establish a first communication tunnel between the access gateway and the forwarding plane network element, and the tunnel establishment request is generated by the controller based on information that is about the forwarding plane network element and that is sent by the control plane network element after the control plane network element determines the forwarding plane network element after receiving a dial-up packet sent by user equipment, wherein the dial-up packet comprises an internet protocol (IP) address of the user equipment corresponding to a second communication tunnel;

receive a tunnel switch request from the access gateway, wherein the tunnel switch request is used to switch a communication tunnel corresponding to the IP address from the second communication tunnel to the first communication tunnel, the tunnel switch request is generated by the controller based on the information about the forwarding plane network element, and the second communication tunnel is between the access gateway and another forwarding plane network element; and establish the first communication tunnel to the access gateway, wherein the first communication tunnel is in a correspondence with the IP address.

6. The network device according to claim 5, wherein the information about the forwarding plane network element comprises interface information of the forwarding plane network element and interface information of the access gateway.

7. The network device according to claim 5, wherein dial-up success information comprises service level agreement (SLA) information corresponding to the IP address, and the forwarding plane network element is determined based on the SLA information in the dial-up success information returned by an external server, after the control plane network element generates an authentication request based on the dial-up packet and sends the authentication request to the external server.

8. The network device according to claim 5, wherein the network device is further caused to:

receive a data packet from the access gateway through the first communication tunnel, wherein a source IP address of the data packet is the IP address.

9. The network device according to claim 5, wherein the network device is further caused to:

receive session information sent by the control plane network element, wherein the session information is generated by the forwarding plane network element based on the dial-up success information returned by the external server, and the session information corresponds to the IP address; and publish routing information to the outside based on the session information, wherein a destination address of the routing information is the IP address.

10. A dial-up packet processing system, wherein the system comprises a forwarding plane network element, and a control plane network element that are connected to each other, the forwarding plane network element is configured to:

receive a tunnel establishment request from an access gateway, wherein the tunnel establishment request is used to establish a first communication tunnel between the access gateway and the forwarding plane network element, and the tunnel establishment request is generated by a controller based on information that is about the forwarding plane network element and that is sent by the control plane network element after the control plane network element determines the forwarding plane network element after receiving a dial-up packet sent by user equipment, wherein the dial-up packet comprises an internet protocol (IP) address of the user equipment corresponding to a second communication tunnel;

receive a tunnel switch request from the access gateway, wherein the tunnel switch request is used to switch a communication tunnel corresponding to the IP address from the second communication tunnel to the first communication tunnel, the tunnel switch request is generated by the controller based on the information about the forwarding plane network element, and the second communication tunnel is between the access gateway and another forwarding plane network element; and establish the first communication tunnel to the access gateway, wherein the first communication tunnel is in a correspondence with the IP address.

11. The system according to claim 10, wherein the information about the forwarding plane network element comprises interface information of the forwarding plane network element and interface information of the access gateway.

12. The system according to claim 10, wherein dial-up success information comprises service level agreement (SLA) information corresponding to the IP address, and the forwarding plane network element is determined based on the SLA information in the dial-up success information returned by an external server, after the control plane network element generates an authentication request based on the dial-up packet and sends the authentication request to the external server.

13. The system according to claim 10, wherein the network device is further configured to:

receive a data packet from the access gateway through the first communication tunnel, wherein a source IP address of the data packet is the IP address.

14. The system according to claim 10, wherein the network device is further configured to:

receive session information sent by the control plane network element, wherein the session information is generated by the forwarding plane network element based on the dial-up success information returned by the external server, and the session information corresponds to the IP address; and publish routing information to the outside based on the session information, wherein a destination address of the routing information is the IP address.

* * * * *